United States Patent [19]

Chauvel

[11] Patent Number: 4,562,812

[45] Date of Patent: Jan. 7, 1986

[54] ELECTRONIC IGNITION CONTROL FOR INTERNAL COMBUSTION ENGINE

[75] Inventor: Gerard Chauvel, Cagnes, France

[73] Assignee: Texas Instruments Incorporated, Dallas, Tex.

[21] Appl. No.: 572,500

[22] Filed: Jan. 20, 1984

[51] Int. Cl.[4] ............................................. F02P 5/00
[52] U.S. Cl. .................................... 123/417; 123/416; 123/418
[58] Field of Search ............... 123/414, 416, 417, 418, 123/480

[56] References Cited

U.S. PATENT DOCUMENTS

| | | | |
|---|---|---|---|
| 4,181,884 | 1/1980 | Shirasaki et al. | 123/414 |
| 4,249,493 | 2/1981 | Honig et al. | 123/416 |
| 4,273,089 | 6/1981 | Maier | 123/416 |
| 4,274,141 | 6/1981 | Tokuda et al. | 123/417 |
| 4,399,802 | 8/1983 | Oshiage et al. | 123/417 |
| 4,414,946 | 11/1983 | Daumer et al. | 123/416 |
| 4,425,890 | 1/1984 | Yamaguchi | 123/418 |
| 4,445,477 | 5/1984 | Ikeura | 123/416 |
| 4,450,528 | 5/1984 | Yaegashi et al. | 123/417 |
| 4,450,815 | 5/1984 | Mouri | 123/416 |

*Primary Examiner*—Parshotam S. Lall
*Attorney, Agent, or Firm*—Richard A. Bachand; N. Rhys Merrett; Melvin Sharp

[57] ABSTRACT

Method and apparatus for ignition control of an internal combustion engine provide for computation of an ignition instant based upon operating parameters of the engine measured during a preceding ignition cycle. A device for controlling the ignition of the engine includes a central calculating unit (17) and a peripheral input-/output unit (1) controlled by a micro-code program stored in a micro-code ROM (18). Computation of engine speed is accomplished by a disk (5a) having teeth on the periphery (5b), and cooperating with a magnetic detector (5d), the disk being rigid with the crankshaft of the engine to be controlled.

12 Claims, 20 Drawing Figures

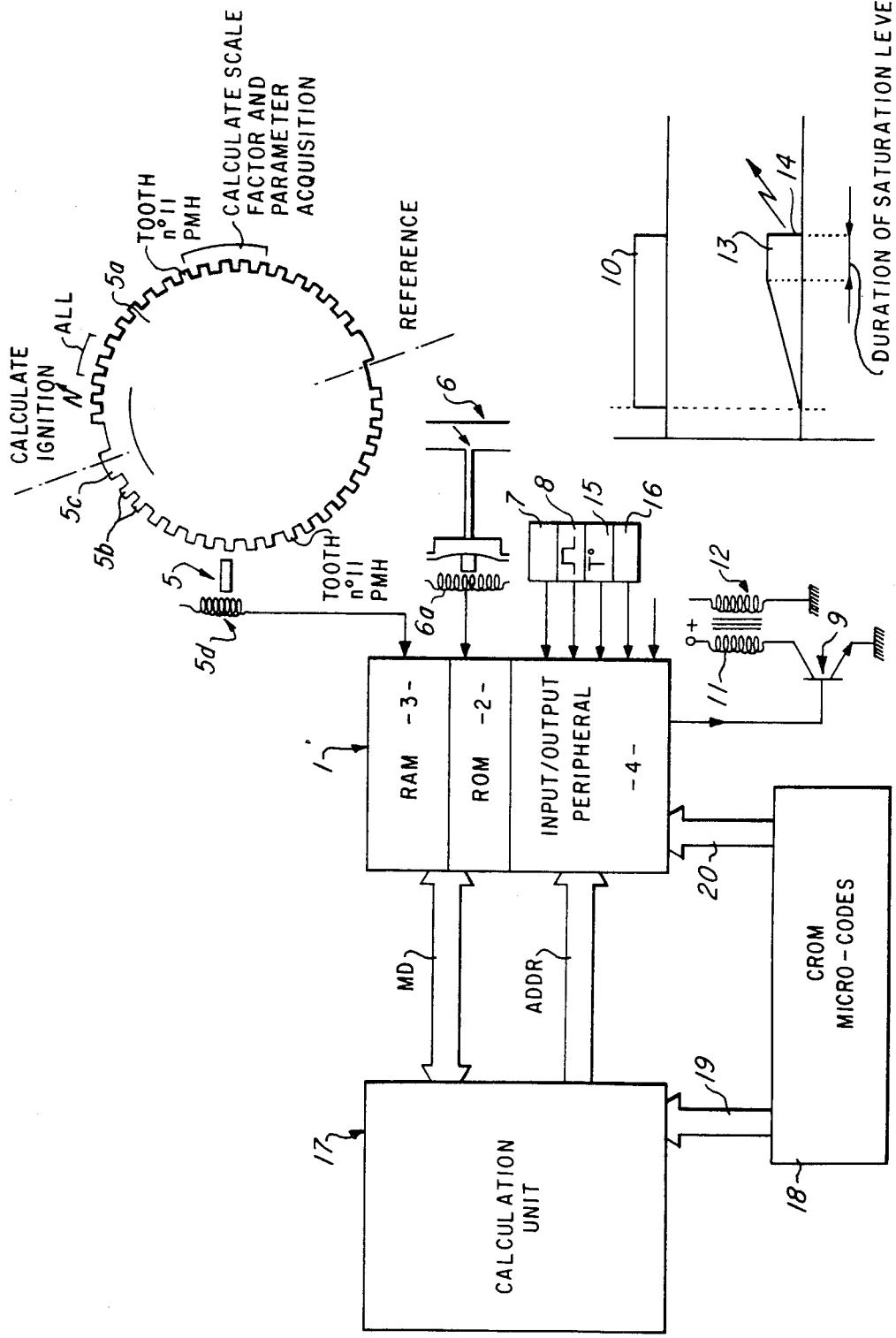

ELECTRONIC IGNITION CONTROL FOR INTERNAL COMBUSTION ENGINE

The instant invention relates to an ignition or injection control circuit for an internal combustion motor.

In the present description, the term "ignition" designates all operations which could trigger in the cylinders of an internal combustion motor, the inflammation of a combustable mixture, the injection of a combustable being thus expressly included in the term "ignition".

Currently, ignition control circuits are made with conventional logic, that is, with logical gates, computers, memories and, sometimes, with an arithmetic unit.

Each counter and each logical element corresponds to a well defined function, the implantation of the functions on an integrated circuit being optimized in order to obtain the smallest possible size of circuit chip.

Such a control circuit has the drawback of necessitating a costly study of complete integration, and it is impossible to modify the functioning of the circuit due to the substantial complexity and thereby to adapt the circuit to different types of internal combustion motors.

It is therefore desirable to produce the ignition control circuit with the use of a microprocessor of which the program instructions set forth a measurement and calculation algorithm equivalent to that realized by the functions of a conventional logic circuit. However, until now one has not succeeded in embodying a microprocessor in an ignition control circuit in such a way that the measurements and the calculations are sufficiently rapid for a constant updating of the parameters governing the ignition and for the rapid determination of the instant of ignition.

The invention has therefore as an object a process and an ignition control circuit which can utilize standard material and be capable of following almost instantaneously any modification of the functioning parameters of the internal combustion motor for immediately determining a new ignition instant as a function of these new parameters.

The invention has thus as an object a process of ignition or injection control of an internal combustion motor with the use of a microprogrammed calculator, characterized in that there is generated a pulse signal, the frequency of which represents the speed of rotation of the motor, there is calculated the ignition instant of the current ignition cycle expressed in fractions of the period of said pulse signal, these fractions being measured with a scale which evolves from one ignition cycle to another, said scale resulting from a calculation effected during the preceding ignition cycle, and one triggers the current ignition after a count of said fractions of the period of the pulse signal produced from a reference instant marking the beginning of the current ignition cycle, and taking into account the evolution of the speed of rotation, which entailed a modification of the time value of said fractions of the pulse signal period.

From these characteristics, the ignition is effected practically in real time taking into account all evolution which could necessitate a modification of the ignition instant.

The invention also has as an object an ignition control circuit for carrying out the process set forth above.

Other characteristics and advantages of the invention will appear in the following description, which is given solely as an example, and with reference to the annexed drawings, in which:

FIG. 1 shows very schematically the ignition circuit according to the invention;

FIG. 2 is a diagram illustrating the manner in which the ignition transistor is controlled by a control circuit, according to the invention;

FIG. 1 shows very schematically the ignition control circuit according to the invention.

Figure 3:
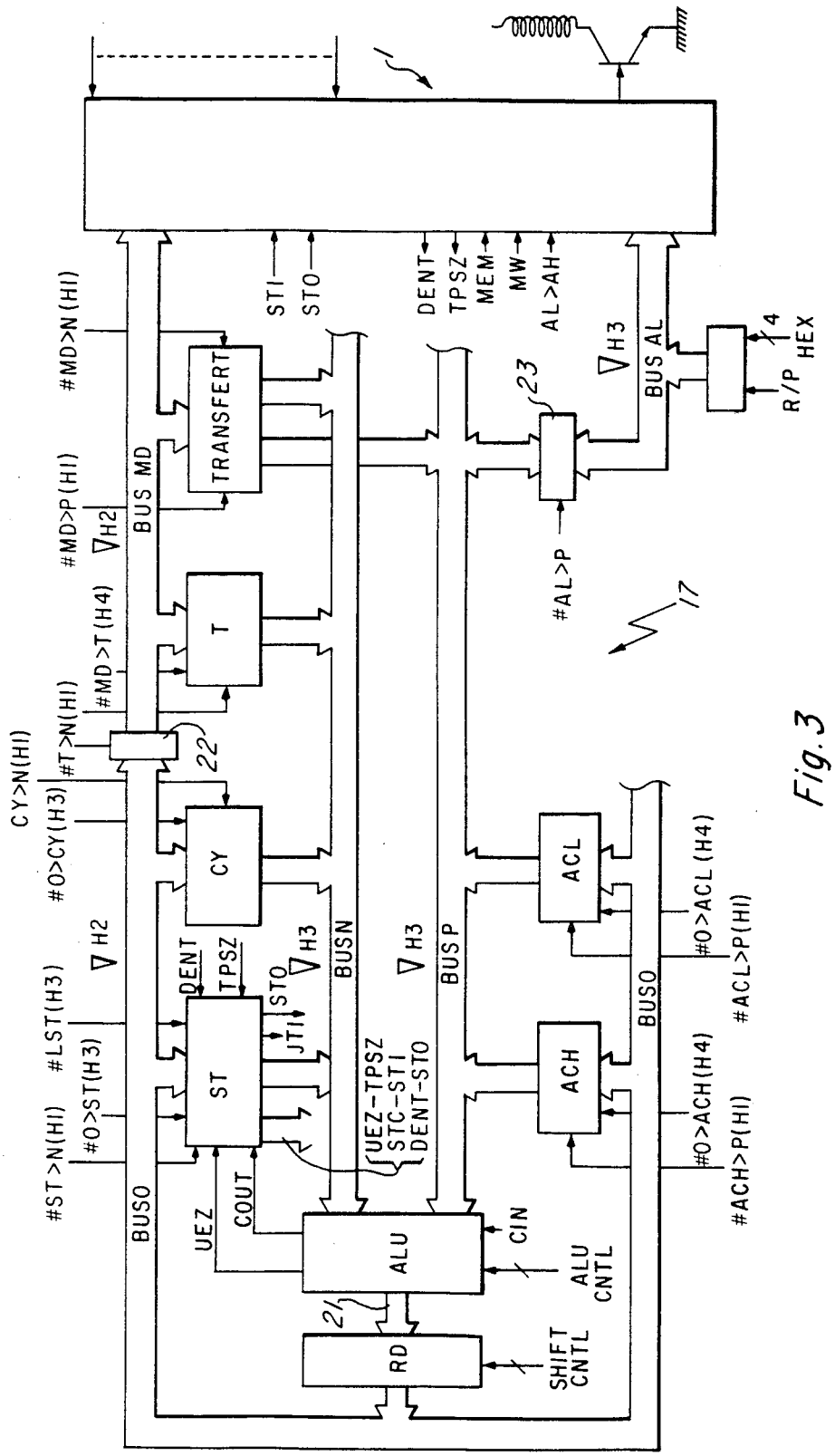
FIG. 3 is a schematic of the calculation unit of the circuit.

It includes a data acquisition and memory unit 1 with a read-only memory ROM 2, a random access memory RAM 3, and an input/output interface unit 4. This acquisition and memory unit is connected to a plurality of peripherals, among them:

(1) A speed pickup including a toothed disk 5a (having for example 44 teeth 5b). The periphery of the disk has, in diametrically opposite positions, two triple teeth 5c, which replace two consecutive normal teeth in order to provide an angular point of reference. The disk 5a is rigid with the crank shaft of an internal combustion engine and provides a signal DENT at each passage of a tooth (single or triple) before magnetic detector 5d. This detector is connected to unit 1.

(2) A pressure pickup for measuring the vacuum in the input manifold for regulating the ignition advance. This pickup provides, by means of magnetic detector 6a, the signal FP which is applied to unit 1.

(3) An anti-knock pickup 7, which can be constructed with a piezo-electric microphonic element placed on the motor crank case, is connected to a frequency filter. This pickup provides a signal at a frequency characteristic of motor knock.

(4) A circuit 8 for providing a signal representating the period during which the ignition transistor 9 is saturated during each ignition. Referring to FIG. 2, it is seen that the ignition signal 10, which is applied to the base of ignition transistor 9, produces in the transistor an excitation current pulse for the primary 11 of coil 12, the final portion of which is a constant current level 13 (FIG. 2). This circuit according to the invention tends to reduce this level and to bring the instant of complete charge of the primary 11 closer to the firing instant 14, which occurs at the descending side of the ignition signal 10.

(5) Temperature pickups 15 (water, ambient air, etc).

(6) Various other pickups 16 can be optionally provided.

The input/output interface 4 is also connected to the ignition transistor 9.

The acquisition and memory unit 1 is connected to a calculating unit 17 by a bi-directional memory and data bus MD for the circulation of data between units 1 and 17, and by unidirectional address bus ADDR which provides for the circulation of addresses through memories 2 and 3, these addresses being processed in the calculating unit 17.

The ignition control circuit also includes a control memory 18, (CROM), in which are memorized the microcodes which are adapted to assure the carrying out of the working program of the ignition control circuit. This memory is in permanent communication with units 1 and 17 by means of buses 19 and 20.

Calculating Unit 17.

Calculating unit 17 will now be described with reference of FIG. 3. It includes an arithmetic and logic unit ALU to which are connected two buses N and P and a shift register RD, this latter affording to unit ALU a large data processing power, in regard to the data which comes to this unit via the bus N and P.

The content of the ALU can be transferred to the shift register by connection 21, this register being connected to output bus O which is adapted to contain the result of a calculation or of a logical operation carried out on the values contained in the buses P and N.

The bus O communicates with the bus MD (FIGS. 1 and 3) by means of a transfer gate 22, this bus MD being connected to the acquisition and memory unit 1.

Another transfer gate 23 connects the bus P to an address bus AL which communicates directly with the memories ROM and RAM, 2 and 3. This gate is enabled by a signal AL>P, the generation of which will be described hereinafter.

The calculating unit includes, in addition, registers, each assigned a particular role which can, however, change during the carrying out of the calculation algorithm and the execution of the microinstructions which carry out this algorithm.

These registers are the following:

Register ST—state register of the calculating unit; it memorizes at each instant the result of the calculations; the bits which it contains can effect loop or jump changes during the carrying out of the program defined by the microcodes.

Register CY—cycle counting register which has as principal role the memorization of the number of teeth of the periphery of speed pickup 5 (FIG. 1). This register can also memorize the values to be operated on in unit ALU.

Registers ACH and ACL—these registers are adapted to affect the calculations on 16 bits (8 bits per register), ACH memorizing the 8 bits having the most significant value. They are loaded from output bus O.

Register T—temporary register for temporarily memorizing the values during the carrying out of the microcode program.

Register TRANSFERT—this register functions as a gate and provides for the transfer of the contents of bus MD either to bus P or to bus N.

Register R/P.HEX—this register memorizes a particular field (to be described hereinafter) of microcodes.

All of the registers which have been set forth are enabled by the signals coming from the unit CROM of FIG. 1 and their enablement is thus selectively effected by the microcodes during the execution of the algorithm. These enabling signals are indicated in FIG. 3 and will be described in greater detail subsequently.

Figure 4:
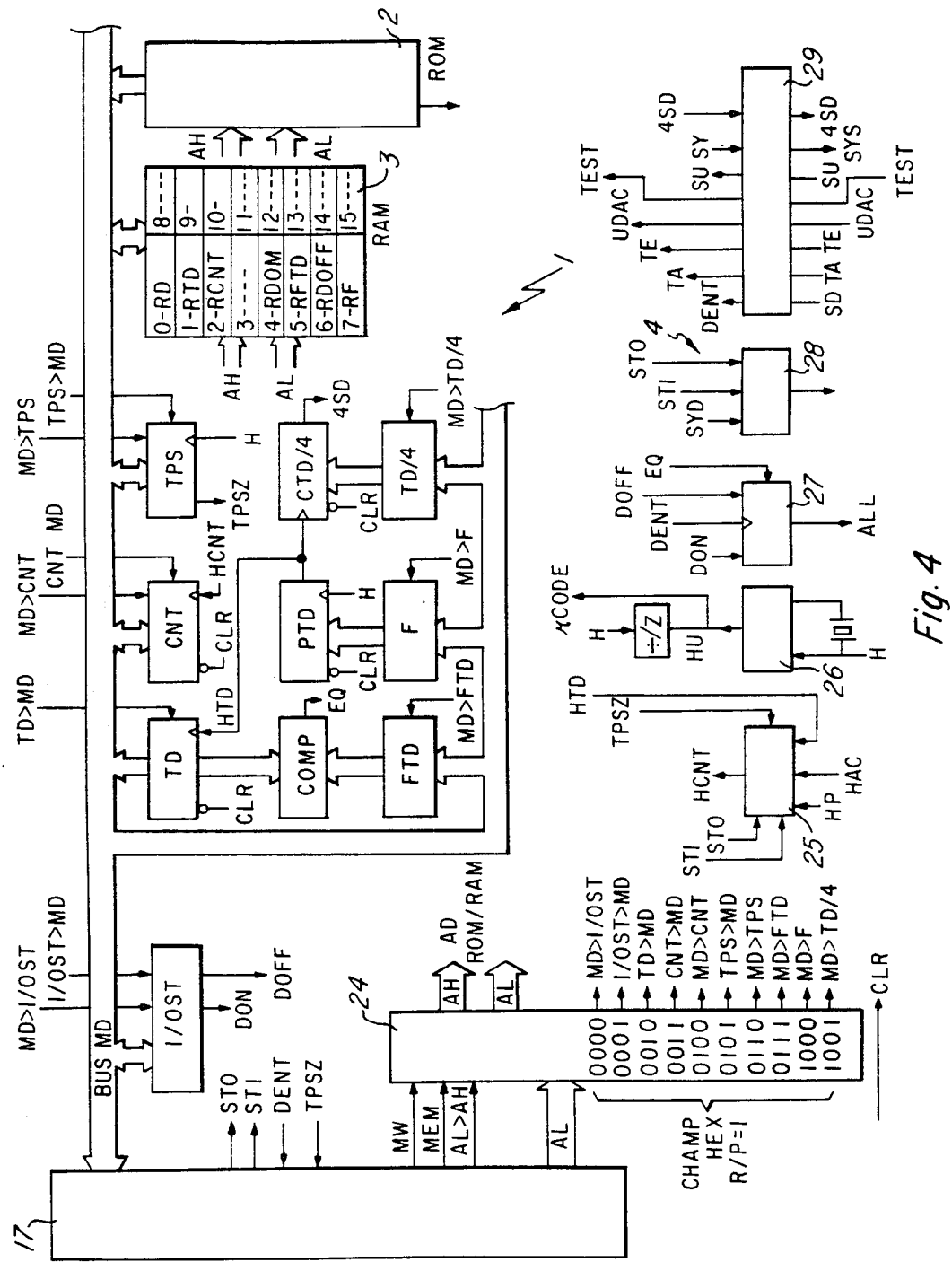
FIG. 4 is a schematic of an input/output peripheral of the circuit.

Acquisition and memory unit 1 (FIG. 4).

The diagram of the acquisition and memory unit 1 is seen in FIG. 4. It is seen that the memorization and data bus MD is directly connected to the data inputs of memories ROM and RAM 2 and 3 and also to a series of registers which form, in particular, the acquisition sector or the sector for the calculation of the speed of the internal combustion motor.

This unit includes the following registers:

Register I/O.ST—this is a state register of the unit 1. The values from the calculation unit are read into it and the register is read out by the calculation unit. It is to be noted that only the four least significant values are utilized.

Register TD—this is utilized as a counter and counts the number of clock pulses H appearing between the leading edges of two consecutive teeth 5 of the pickup disk 5, taking into account a scale factor F by which this number of clock pulses is divided.

Register CNT—this has the role of a counter of a plurality of pulse signals representing the systems clock in diverse forms.

Register TPS—this is a counter of a predetermined interval of time fixed as a function of certain motor constructions parameters to be controlled and determining, for example, the duration of the measurement of speed or other parameters during each ignition cycle. It counts down under control of the base clock signal J. When it is at 0, it produces signal TPSZ.

Register PTD—precounter. This is also counted down by the base clock (signal H) and produces signal HTD when it is at 0, at which moment it is loaded with a value contained in scale factor register F. The signal HTD is counted in register TD.

Register F—this contains a scale factor, which is used, in particular, for the calculation of speed and is updated for each ignition cycle.

Register CTD/4—this is loaded by register TD/4 and provides a signal 4SD when it reaches 0 under control of signal HTD.

Register FTD—this contains a value corresponding to a fraction of a tooth calculated as a function of the last value TD found by calculation.

Register COMP—this constitutes a comparator and provides an equal signal EQ when the contents of the registers TD and FTD are equal.

The registers which have been described are enabled by an address field coming from bus AL from the calculation unit 17, through address decoder 24, this decoder being also connected by address buses AH and AL to memories 2 and 3, the read-in and read-out control being provided on lines MEM and MW. The field HEX constitutes a register control when the field R/P of the microcode concerned is 1.

Input/output Interface (FIG. 4).

This interface includes a first component 25 for the generation of the signal HCNT, adapted to be applied to register CNT.

This component receives:
  the pulse signal HP which represents, at a frequency, the pressure measured by pickup 6;
  the pulse signal HAC which represents the necessary anti-knock correction;
  the signals ST1, ST0 and HTD coming respectively from state register ST, calculation unit 17, and register PTD of the acquisition and memory unit 1.

A second component 26 is provided operating on the base clock signals H and HU from a clock oscillator.

The ignition signal ALL applied to transistor 9 is operated on in component 27 to which are also applied the signals DENT and EQ, above mentioned and also the signals DON and DOF which will be described hereinafter during the discussion of the generation of the ignition signal ALL.

The element 28 of interface 4 is adapted to operate on signal SAC representing the enabling time window of the anti-knock control. It is generated from the signals SYD, ST1 and ST0. The block 29 is an input/output buffer for the following signals:

Signal SD—tooth signal from the pickup coil 5, it produces the signal DENT.
  Signal TA—represents the correction of the ambient air temperature.
  Signal TE—represents the correction of the motor cooling water temperature.
  Signal UDAC—represents the direction of the requisite anti-knock correction.
  Signal TEST—utilized for tests.
  Signal SU—option correction signal.
  Signal SYS—reference signal found by calculation and representing the number of teeth in regard to regulating and controlling the motor.
  Signal 4SD—represents 4×the signal DENT (1.8° of rotation of the crank shaft) used for bench testing the motor.

Figure 5:
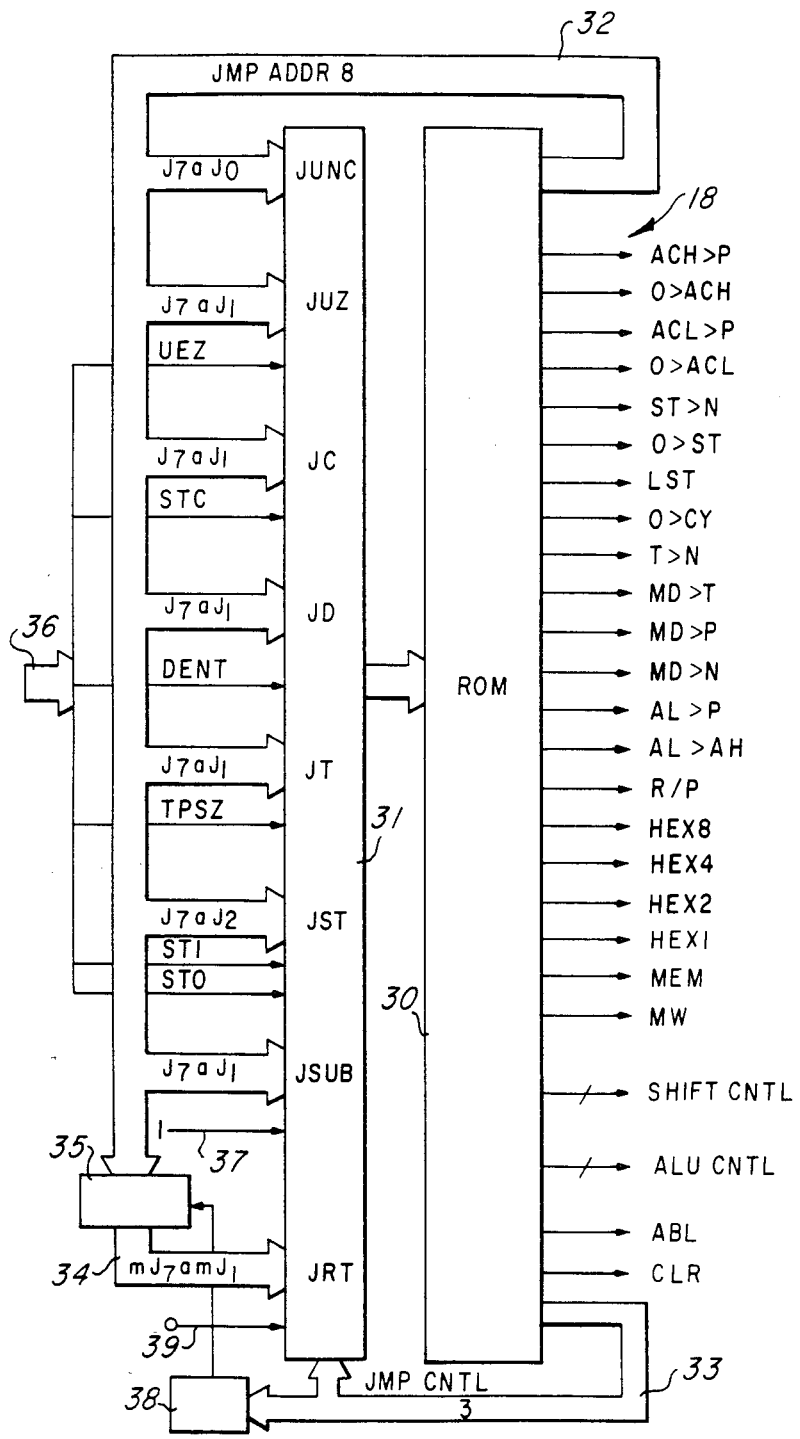
FIG. 5 is a schematic illustrating the multiplexing of the addresses of the memory CROM represented in FIG. 1.

The microcode memory CROM (FIG. 5).

Figure 6:
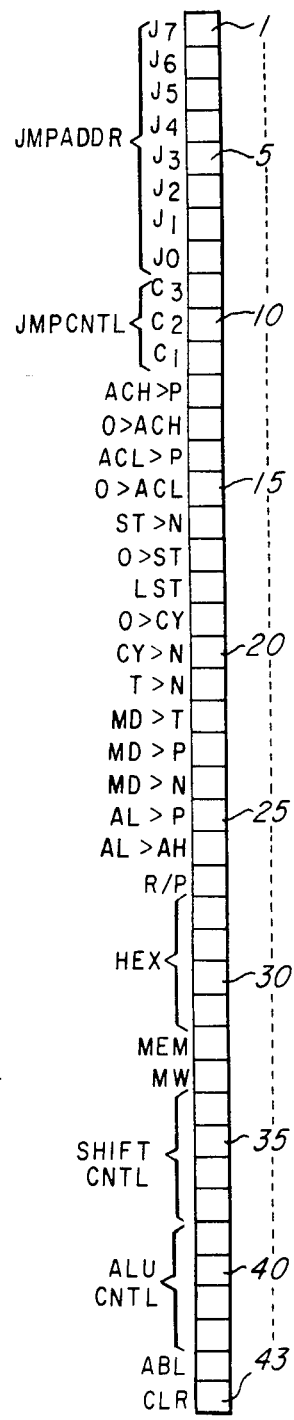
FIG. 6 is a representation of the microcode field utilized in the control circuit.

This circuit includes a memory ROM 30 containing the set of microcodes the totality of the fields thereof being shown in FIG. 6.

The address of this memory ROM are generated in a multiplexer 31 which is connected to an eight bit bus 32 through which circulate the data of certain microcode fields. This bus is relooped on a group of data outputs of the memory ROM 30. Another bus 33 is adapted to contain eight bit data for controlling the multiplexer 31. These data are obtained from another microcode field. Finally a third bus 34 can be conditionally switched on bus 32 traversing through subprogram register 35 which is adapted to memorize the last address of the program being executed during the carrying out of a microcode subprogram. This register is activated by a signal SUB from the field CMPCNTL.

In the example set forth (FIG. 6), each microcode is composed of 43 bits which are divided in the following manner:
  bits 1 to 8—jump field of addresses of microinstructions J0 to J7 (bus 32; FIG. 5);
  bits 9 to 11—control field of jump JMPCNTL applied to multiplexor 31;
  bit 12—ACH>P—transfer the contents of register of ACH to the bus P;
  bit 13—O>ACH—transfer the contents of output bus O to the register ACH;
  bit 14—ACL>P—transfer the contents of register ACL to bus P;
  bit 15—O>ACL—transfer the contents of output bus O to register ACL;
  bit 16—ST>N—transfer the contents of state register ST to bus N;
  bit 17—O>ST—transfer the contents of bus O to state register ST.
  bit 18—LST—load state register ST.

Figure 7:
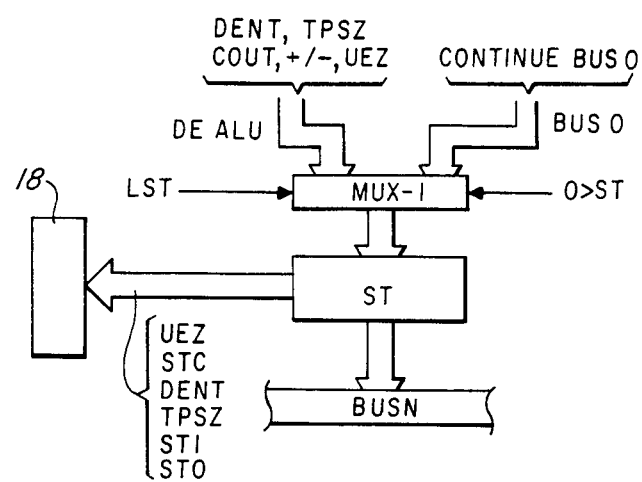
FIG. 7 is a more detailed schematic of the control of the state register and the calculating unit.

In order to understand this operation, reference is made to FIG. 7 in which it is seen that state register ST is connected to two input buses by means of a multiplexor MUX-1 which can be enabled, on the one hand, by the signal LST (bit 18 of the microcode) and, on the other hand, by the signal O>ST (bit 17).

The signal LST loads into the register ST (the three most significant bits) the signals COUT, ± and UEZ (to be described hereinafter) from unit ALU and the signals DENT and TPSZ, from the peripherals (unit 1). The signal O>ST allows the transfer of the contents of the bus O to the register ST, also via multiplexor MUX-1.

bit 19—O>CY—transfer the contents of bus O to the register CY;
  bit 20—CY>N—transfer the contents of register CY to bus N;
  bit 21—T>N—transfer the contents of register T to bus N;
  bit 22 MD>T—transfer the contents of bus MD into register T;
  bit 23—MD>T—transfer the contents of bus MD to bus P;
  bit 24—MD>N—transfer the contents of bus MD to bus N;
  bit 25—AL>P—transfer the contents of bus AL to bus P;
  bit 26—AL>AH—transfer the contents of bus AL to bus AH;
  bit 27—R/P—this bit determines whether the contents of the bits 28–31 (HEX) of the microcode must be transfered into memory RAM 3 of the acquisition and memory unit 1, or if these contents are to enable one of the registers of this unit (see the outputs of decoder 24 in FIG. 4).

In other terms, if the bit 25 (AL>P) is 0, the bit 27 can determine that the bit field 28 to 31 is an address of the memory RAM 3, or that this field designates one among sixteen registers of the unit 1. On the other hand, if the bit 25 is 1 (AL>P=1) the bit R/P and the four bits 28 to 31 serve to introduce a constant into the unit ALU of the calculating unit 17.

This can be illustrated by the following example: suppose there is selected the tooth no. 11 by speed pickup 5. The field of bits 27 to 31 of the microcode considered will be coded in a manner to represent the number 11, the bit AL>P will be 1 and the contents of the field R/P and HEX will be transferred to the bus P. As the register CY contains, at each moment, the number of the tooth which is before detector 5d of the pickup 5, the contents of this register are transferred to the bus N, then, in the unit ALU, the operation P-N is effected. If the result in null (UEZ=0), the current tooth is the tooth no. 11. If the result is not null (UEZ=1), the following operation of the program is a jump to the condition UEZ.

bits 28 to 31—field HEX—which can be any hexadecimal coded number following the calculation operation to be effected;
  bit 32—MEM—enabling a reading operation into the memory;

bit 33—MW—enabling a writing operation into the memory;

bits 34-37—SHIFTCENTL—the bits of this field determine the shifting to be effected in the register RD and the corresponding outputs of the microcode memory ROM 3 (FIG. 5) are directly connected to register RD (see FIG. 3);

bits 38 to 41—ALUCNTL—these bits determine the logical or arithmetic operation to be effected in unit ALU. The corresponding outputs of ROM 30 are directly connected to the unit ALU (FIG. 3);

bit 42—ABL—this bit determines whether the calculation operation is arithmetic or boolean;

bit 43—CLR—this is a reset to 0 bit.

It is seen therefore that, according to an important aspect of the invention, each microcode can itself contain in its field 27 to 31, either the addresses, or the constants, or the parameters on which the calculation operations are to be effected. Everything occurs, therefore, as if, in the second case, the constants and the parameters were extracted from the memory. However, memory reading requires a plurality of steps of the microinstruction program and this results in a lower processing speed. This aspect of the invention permits therefore a faster speed of operation and also the obtainment of a substantially higher degree of programming flexibility, as compared with the traditional circuits of this type. Microcode addressing.

The addressing of the following microcode during the execution of the microcode program is determined by the fields 1 to 8 JMPADDR under control of the fields 9 to 11 JMPCNTL in the multiplexor 30. These jump conditions are indicated in the following table.

the signal UEZ=1 if the result of a calculation operation is equal to 0 on the output bus O at the output of ALU unit (FIG. 3).

The condition JC selects an address composed of bits J7 to J1 and having the value of the signal COUT, which is the carry stored in the state register ST after a calculation operation in the unit ALU during the execution of the preceding microcode. This condition can, therefore, also permit access to the two addresses of the following microcode, regardless whether or not there is a carry.

The condition JD establishes an address jump determined as set forth above, however, the last address bit is given as a function of the signal DENT. An analagous condition JT establishes the address jump as a function of the signal TPSZ.

The condition JST is a group condition which, as a function of the state of bits ST1 and ST0 of the state register ST, permits the establishment of one address among four. The base address of each group thus defined is determined by the bits J7 to J2 of the field JMPADDR and the signals ST1 and ST0 which replace the bits J1 and J0. One can thus select the addresses JMPADDR, +0, +1, +2, and +3.

When JMPCNTL establishes the condition JSUB, the system accesses a microcode sub-routine of which the first address is JMPADDR+1, imposed by the last bit which is set to 1 by hard wiring (connection 37, FIG. 5). The address field JMPADDR is memorized by the value 110 of JMPCNTL in register 35, this value being applied to the register after logical detection in a gate 38, of which the output can enable this register. After the carrying out of the sub-routine, the condition JRT

TABLE I

| | JMPCNTL | | | | | | | | JMPADDR |
|---|---|---|---|---|---|---|---|---|---|
| *JUNC | 000 | J7 | J6 | J5 | J4 | J3 | J2 | J1 | J0 |
| *JUZ | 001 | J7 | J6 | J5 | J4 | J3 | J2 | J1 | 0 if UEZ = 0 |
| | | J7 | J6 | J5 | J4 | J3 | J2 | J1 | 1 if UEZ = 1 |
| *JC | 010 | J7 | J6 | J5 | J4 | J3 | J2 | J1 | 0 if ST0 = 0 |
| | | J7 | J6 | J5 | J4 | J3 | J2 | J1 | 1 if ST0 = 1 |
| *JD | 011 | J7 | J6 | J5 | J4 | J3 | J2 | J1 | 0 if DENT = 0 |
| | | J7 | J6 | J5 | J4 | J3 | J2 | J1 | 1 if DENT = 1 |
| JT* | 100 | J7 | J6 | J5 | J4 | J3 | J2 | J1 | 0 if TPSZ = 0 |
| | | J7 | J6 | J5 | J4 | J3 | J2 | J1 | 1 if TPSZ = 1 |
| *JST | 101 | J7 | J6 | J5 | J4 | J3 | J2 | J0 | 0 if ST1 = 0 ST0 = 0 |
| | | J7 | J6 | J5 | J4 | J3 | J2 | J0 | 1 if ST1 = 0 ST0 = 1 |
| | | J7 | J6 | J5 | J4 | J3 | J2 | J1 | 0 if ST1 = 1 ST0 = 0 |
| | | J7 | J6 | J5 | J4 | J3 | J2 | J1 | 1 if ST1 = 1 ST0 = 1 |
| *JSUB | 110 | J7 | J6 | J5 | J4 | J3 | J2 | J1 | 1 Jump to address Jn odd and memorise |
| | | mJ7 | mJ6 | mJ5 | mJ4 | mJ3 | mJ2 | mJ1 | return address in mJn |
| *JRT | 111 | mJ7 | mJ6 | mJ5 | mJ4 | mJ3 | mJ2 | mJ1 | 0 Jump to return address mJn even |

The condition JUNC corresponds to the case where the field of instruction JMPCNTL selects the addressing path JUNC by which the address of the following microcode is determined by the eight bits of the address field JMPADDR.

In the condition JUZ, the address of the following microcode is determined by the seven bits of greatest significance of the field JMPADDR, J7 to J1 and by the signal UEZ coming from state register ST via the bus 36 (FIGS. 3, 5 and 7). This signal UEZ is selected by multiplexor 31 on bus 36 and can take the value 1 or 0 in constituting the eighth bit of the following microcode address. This results in that this addressing mode allows access to two contiguous microcode addresses as a function of the result of the calculation during the execution of the preceding microcode. It is to be noted that allows the return to the principal program at the return address of which the last bit is set to 0 by hard wiring (connection 39).

The state register ST of the calculating unit contains eight bits, which are distributed in the following manner.

| STC | STSB | STEZ | free | DENT | TPSZ | ST1 | ST0 |
|---|---|---|---|---|---|---|---|

The bit STC is set by the carry of a calculation operation in unit ALU.

The bit STSB represents the sign of the result of a calculation operation and is set by the bit of the most significant value of the result of a calculation operation in unit ALU.

The bit STEZ represents the signal UEZ which is "1" when the output bus is "0".

The bit DENT results from the signal DENT from input/output buffer 29 (FIG. 4).

The bit TPSZ changes state in response to the signal produced by register TPS.

The bits ST1 and ST0 are generated by particular microcodes which are presented during the execution of the program for designating four measurement subroutines. The numerical values corresponding to these bits can be contained in the field HEX of the corresponding microcodes. One can also store the values at particular addresses of the memory ROM2 and read the addresses into the memory at the proper moment by means of a set of corresponding microcodes. As indicated above, the bits ST1 and ST0 intervene in the jump conditions JST, when the field JMDCNTL is at the value 101.

It is to be noted that the bits ST1 and ST0 of the register ST also determine the signal HCNT controlling counter CNT, this signal thus constituting different timing means from signal HP, HAC, HTD which are selectively transferred to counter CNT as a function of the binary value of the signals ST1 and ST0 (see component 25 of FIG. 4). These different times are specific for the durations of measurements to be carried out as will be seen subsequently during the description of the function flow chart.

The state register I/OST of the acquisition and memory unit has eight bits of which only the four least significant bits are utilized as in the following distribution:

| Read | Free | Free | Free | Free | Free | UDAC | TE | TA |
|---|---|---|---|---|---|---|---|---|

| Write | Free | Free | Free | Free | DOF | DON | SYD | SYV |
|---|---|---|---|---|---|---|---|---|

The significance of these signals will be shown subsequently.

Figure 8:
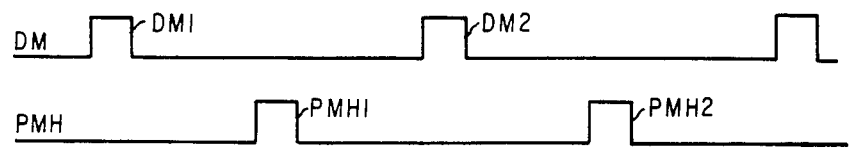
FIG. 8 is a time diagram showing the appearance of the signals DM (reference tooth) and PMH (high still point) during a turn of the crank shaft of the internal combustion motor.

Principal of functioning, (FIG. 1 and Timing diagram of FIG. 8).

During each passage of a tooth and the immediately following space before the detector, the ensemble of the microcode program is carried out in executing the appropriate program loops with conditional jumps. More specifically, the microcode program measures the number of appearances of the signal HTD from register PTD until the leading edge of the following tooth. The program procedes with the search for the first triple tooth 5c (FIG. 1) for producing, if appropriate, a signal SYD which then serves a time reference during the following half turn of the disc and for determining the exact moment of ignition. The program also controls, on the one hand, a search test for the tooth during which the ignition transistor is to be placed into conduction in regard to an established time reference (DON) and, on the other hand, a search test for the tooth during which the transistor must be cut off (DOF) for generating the ignition signal at the exact moment determined by the calculations previously effected. The requisite measurement for the calculation of the ignition instant are commenced at the appearance of the signal SYV which represents the instant at which a piston of the motor is at its high still point. These measurements are also effected as a function of tests which are carried out during each program cycle, this being done, as indicated above, entirely during each passage of a tooth before the detector, the sub-routine loops being executed each time following the results of the effected tests. The microprogram (Flow-chart of FIGS. 9, 10, 11a and 11b).

The organisation of the microcodes is shown in table II below, it being understood that the word DENT is the designation of the corresponding microcodes and must not be confused with the signal DENT which results from the signal "syncro-dent" SYD mentioned above. There is annexed to the instant description a detailed listing of the principal microcodes set forth in Table II.

TABLE II

```
   INIT
   *
   *
   *
00 WAIT <****
   *  *    *
   *  ********
   *
   *
01 TRAN1
   *
02 TRAN2
   *
03 TRAN3
   *
04 TRAN4
   *
05 TRAN5
   *
06 TRAN6
   *
07 DENT1
   *
08 DENT2**>SYD1(0B)**>SYD2(0C)**>Calculation advance>DENT 11
         *
       * SYD1B(0D)
         *
0A DENT3<****
         *
09 DENT4
```

TABLE II-continued

```
*
0E  DENT5
    *
0F  DENT6**>SYV1(11)**>SYV2(1B)**>SYV3(1C)**>SYV4(1D)**>Calculation
    *                                                              *
    *                                          scale factor
    *   *                                      $RF = \frac{RTD \times RF}{32}$
    *
    *
    *                                                 *
    *                                          DENT 11
10  DENT7
    *
12  DENT8**>RDON1(15)**>RDON2>$\substack{\text{Calcu-}\\\text{lation}}$ $FTD = \frac{RTD*RFTD}{32}$ >DENT 11
    *
14  DENT9
    *
1A  DENT10**>RDOF1(17)**>RDOF2>$\substack{\text{Calcu-}\\\text{lation}}$ $FTD = \frac{RTD*RFTD}{32}$ >DENT 11
16  DENT11**>EXIT1(18)**>EXIT2(1E)**>EXIT3(1F)**>EXIT4(24)**>
    *                         *                *
    *                         *                EXIT5(26)**>
    *                         *                *
    *                         *                EXIT6(27)
    *                         *********        *
    *                                          *
    *                                          EXIT7(25)
    *                                          *
    *                                          EXIT8(28)
    *                                          *
    *                                          WAIT(00)
    *
19  MES1
    *
*******************************
********************
*********
  *         *         *         *
  20        21        22        23
  FONC0     FONC1     FONC2     FONC3
  *         *         *         *
  DENT11    VIT1      PRES1     ANTI1
  *         *         *         *
  *         *         *         *
  *>$\substack{\text{Calcu-}\\\text{lation}}$ /CY-(11+1)/×32+ $\frac{RCNT \times 32}{RTD}$
  *         *         *         *

----v----------
    DENT 11
```

The first microcode WAIT is a waiting loop which commences from the following initial conditions.

TABLE III

| Register | Condition |
|---|---|
| T: | RDT/4 measured and retained in preceding cycle |
| CY: | State of DENT counter = RF-scale factor |
| ST: | Jump condition previously established |
| ACH: | RFTD-fraction of DENT |
| ACL: | Zero |
| CNT: | Depends upon the measurement in progress |
| TPS: | Depends upon the measurement in progress |
| FTD: | Fraction of tooth to generate for the ignition signal |
| F: | Scale factor with respect to speed |
| TD: | ¼ of the value of the last measured TD generates 4 ST |
| I/O: | Static parameters of the interface |

Figure 9:
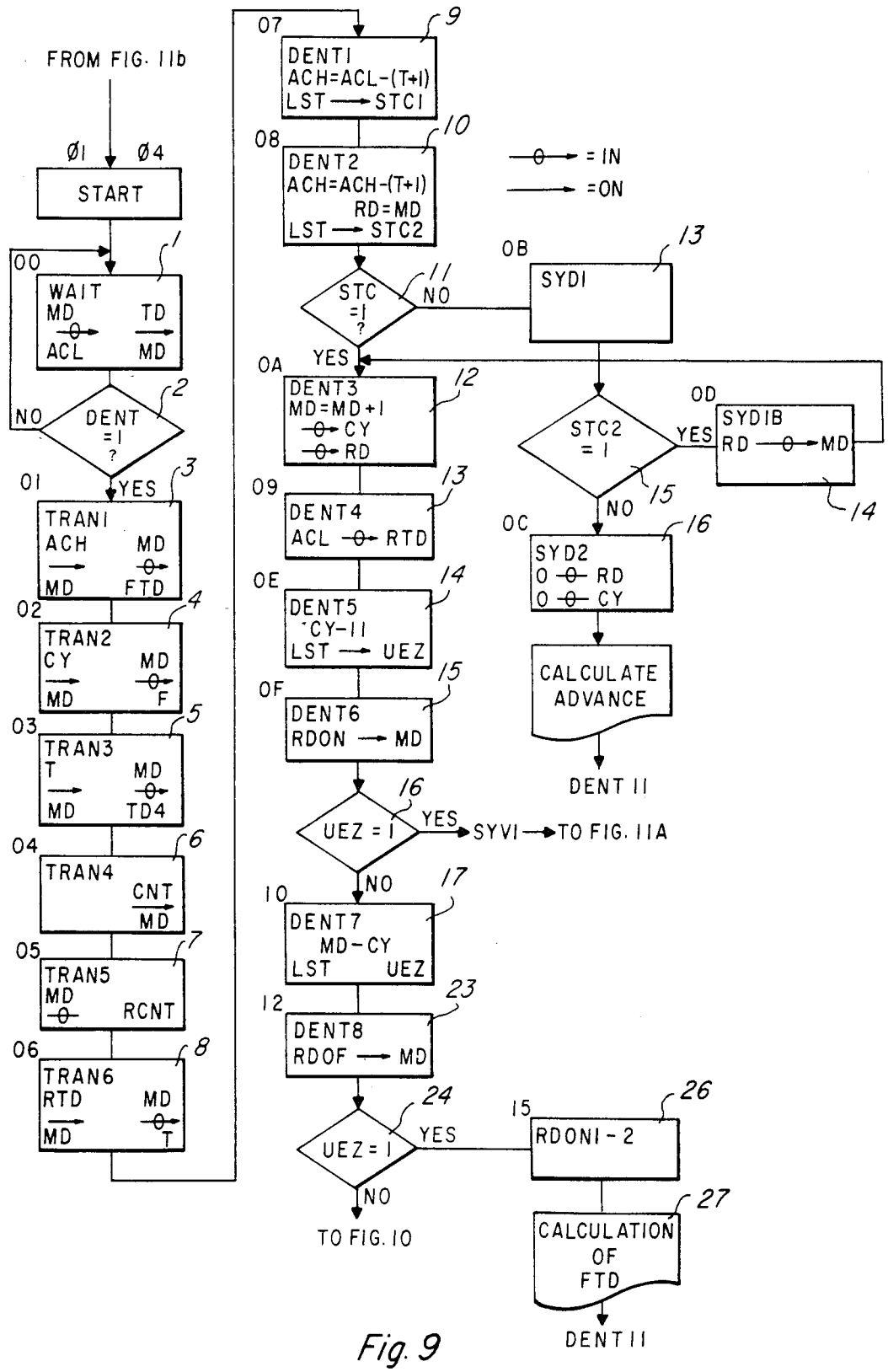
FIGS. 9, 10, 11a and 11b show a flow chart illustrating the program of microcodes used in the circuit according to the invention.
Figure 12:
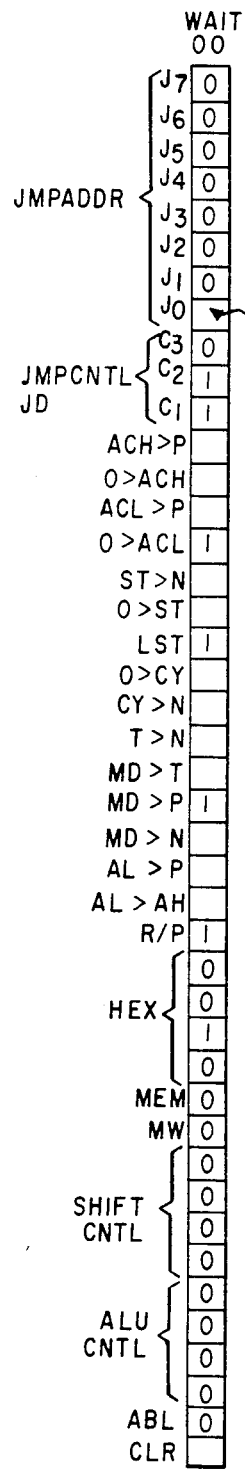
FIGS. 12 to 16 show the contents of the fields of some program microcodes.

The microcode WAIT (00) defines the waiting loop and is shown in the boxes 1 and 2 of the flow chart of FIG. 9. The values of the bits that it includes are indicated in FIG. 12. It is seen that the field JMPADDR is 0 and that the bit J0 can take the value 0 or 1 according to whether a tooth is not, or is, present before the detector 5d. The field JMPCNTL is at the value 011 (see Table 1) since it is precisely a question of waiting for a tooth to pass before the detector, at which the signal DENT becomes equal to 1 in replacing the bit J0 of the field JMPADDR.

The bus N is set to zero by Z>N. The bit R/P of the microcode WAIT being 1, the field HEX which is at 0010, is transferred to decoder 24, in positioning in the decoder the operation TD>MD, the contents of the register TD being thus transferred to the bus MD. The bus MD is connected to bus P by PD>P. The field ALUCNTL is at 0000, in enabling the unit ALU for an addition operation (PADDN). The bit ABL being at 0, the unit ALU thus effects the arithmetic operation P+N+O. The field SHIFTCNTL is at a value 0000 and the carry is equal to zero (ZCI).

The operation thus effected in the unit ALU permits the transfer of the contents of register TD to the bus O, which contents had been transferred into the register ACL by the signal O>ACL.

Thus, during the waiting period of a transition of the DENT signal, the value of TD is read at each passage of the microcode WAIT, and transferred into the register ACL.

The address of the mext microcode is conditioned by jump condition JD (Table 1), as indicated above. If the signal DENT is 1, the address of the following microcode is augmented by a unit and the program then leaves the delay loop in effecting a jump to the microcode TRAN 1 (01), seen at box 3 of FIG. 9.

It is seen, therefore, that the function of the first microcode WAIT consists, on the one hand, of testing if a tooth in the disc periphery is found by the detector 5b and, on the other hand, in preparing the data for the following microcodes in accessing the register TD, which permits the commencement of the calculations.

The bus N is preloaded in a known manner to the value zero during the phase H3 of each execution cycle of a microcode, each cycle necessitating four leading edges of the base clock (H1 to H4). The signal Z>N indicates that none of the registers of the calculating unit is connected to this bus. This value 0 is an inherent condition of the system and does not necessitate therefore any bit position in the microcodes.

The boxes 3 to 8 of the flow-chart (FIG. 9) concern the execution of microcodes TRAN 1 to TRAN 6 having addresses 01 to 06.

Figure 13:
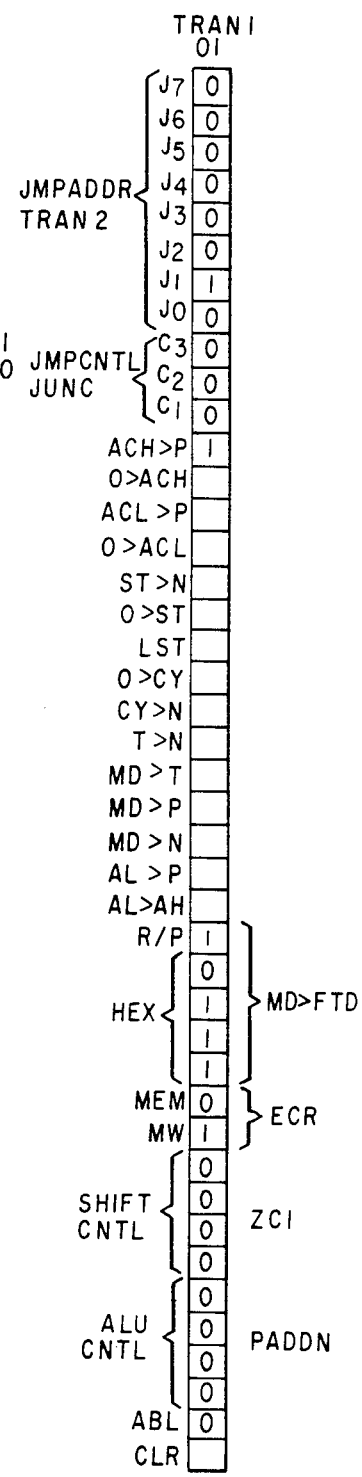
Figure 14:
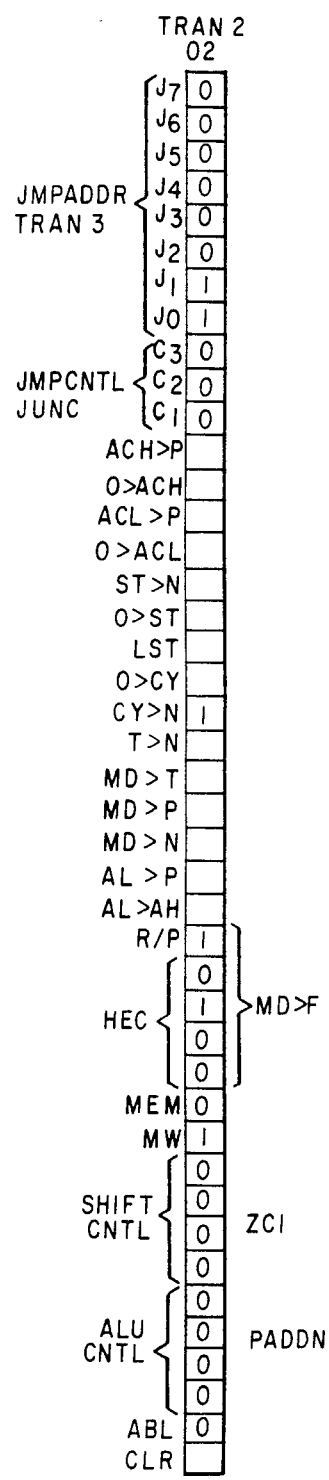

The execution of the microcode TRAN 1 is described hereinafter (FIG. 13).

This microcode consists in transferring the contents of the register ACH, which contains the value FTD (to be described hereinafter) to the register FTD. The register ACH had received this value during the loop of the EXIT microcodes, found at the end of the listing.

The value contained in the register ACH is placed on bus P (ACH>P=1), the bus N contains the value zero as an inherent condition. The unit ALU receives the order PADDN, and the result (FTD) is placed on bus MD. As the field R/P orders a read-in into a register, the binary value of a field HEX determines, by the decoder 24 the selection of the register FTD which will thus receive the contents of bus MD, that is, the value FTD, as MW is at 1.

Then, the program effects a jump (TRAN 2) for the execution of microcode TRAN 2 (box 4 of FIG. 9).

This microcode has as its object the transfer of the contents of the register CY (FIG. 3), which has the value F, in the register F (FIG. 4). This content is transferred on bus N by CY>N, P being at 0 as an inherent condition, the field ALUCNTL orders PADDN and the field R/P orders an addressing operation of the register by HEX=1 000 decoded in the decoder 24. It results from this that the result of PADDN transferred on the bus MD is written into the register F, MW being at 1. The program effects thereafter JUNC (TRAN 3).

The following microcodes TRAN 3 to TRAN 6 (03 to 06) are thereafter executed in an analagous manner conforming to the listing which is found in the annex at the end of the instant description, in order to transfer all of the necessary parameters, during the execution of a complete program cycle, in the various registers of the apparatus.

The program then passes to the search for a triple tooth 5c for the establishment of a reference. This search is based on the result of a calculation operation designed to measure the duration between two transitions of the signal DENT or, in other terms, the establishment of the amount of time between the passage of one tooth before the detector and the passage of the following tooth, (the duration is called hereinafter, for convenience, a "tooth duration").

This duration is counted in the register TD (FIG. 4), operating as a counter which is controlled by the signal HTD from register PDT constituting a "precounter" which, at each passage through zero, is loaded with the contents of scale factor register F.

A concrete example will illustrate the choice that has been discussed.

Suppose that the internal combustion motor can turn at a maximum speed of 6,400 T/M and that the base clock produces a clock cycle of 6.6 microseconds.

In these conditions:
Duration of a turn of the motor: 60/6,400=9.38 ms,
Duration of a passage of a tooth and adjoining speed before the detector 5d: 9.38/44=213 microseconds.

Thus, if the scale factor F=1→the value TD will be 213/6.6=32.3.

Of course, and even if all other things are equal, the value TD will not be the same from the moment when the motor status differs from 6,400 T/M. However, due to an algorithm defined by a group of microcodes of the program, the circuit which is the object of the invention, analyzes the value contained in register TD in order to calculate a new scale factor to be loaded into the register F. This operation entails that a value equal to a power of 2 can always be loaded into the register TD, this value being preferably equal to 32, and, this, so that the apparatus will be, to the maximum extent, compatable with the general architecture conceived for eight bits, while maintaining an acceptable accuracy in the determination of the instant of ignition. This also permits the determination, with an accuracy fixed down to a 1/32nd of a tooth duration of the firing instant of the motor pistons. Consequently, the program is designed so that after the updating calculation, a value of approximately 32 will be entered in the register TD, during each ignition cycle, it being understood that this value can change during the course of this cycle and differ from 32 until the following update.

The following example will illustrate the updating of the value TD. If, at a given moment, TD=52, with a scale factor F=12, the equivalent number of transitions of the clock base H is:

$$52 \times HTD \text{ with } HTD = 12 \times H.$$

Thus, $52 \times 12 = 624$ transitions.

The new value of the scale factor F is: 624/32=19.5 and the entire value 19 is loaded in register F. At a constant speed, this new scale factor yields during the following cycle: 634/19=32.8.

The entire value, that is 32, is thus loaded in register TD during the following cycle.

In a general manner:

$$F_n = \frac{TD_{n-1} \times F_{n-1}}{32}$$

It results from this that at each ignition cycle, the value TD represents approximately the total duration of a tooth with a degree of error which can be expressed in 1/32nd's of the duration of a tooth.

The value TD being calculated and loaded each cycle, it is utilized in particular for localizing in time a triple tooth of the disc periphery 5a which constitutes the above mentioned reference (signal SYD or DM). This permits the generation of the control signal and effects the measurements in synchronism with the rotation of the controlled motor.

As set forth above, the disc includes two teeth of a triple duration and these particular teeth constitute an angular reference. If, therefore, the circuit determines that the current value TD is at least two times larger than the previous value TD, this would indicate a triple duration tooth. The following microcodes of the program examine the variation in the value TD with respect to the value $TD_{n-1}$ of the previous tooth. It is to be noted that this method allows the determination of the direction of rotation of the motor since, if it turns in an reverse direction, the conditions governing the calculation of dTD could never be met.

The calculation of the variation of TD of one tooth to another (value dTD; FIG. 9) is effected by the execution of the microcodes DENT 1 and DENT 2 (address 07 and 08, boxes 9 and 10; FIG. 9).

The algorithm realized by these microcodes is:

$$TD_n - (TD_{n-1} + 1) = dTD$$

dans laquelle:
$TD_n$ = current duration of tooth
$TD_{n-1}$ = duration of preceding tooth
dTD = variation of TD from one tooth to another.

Figure 15:
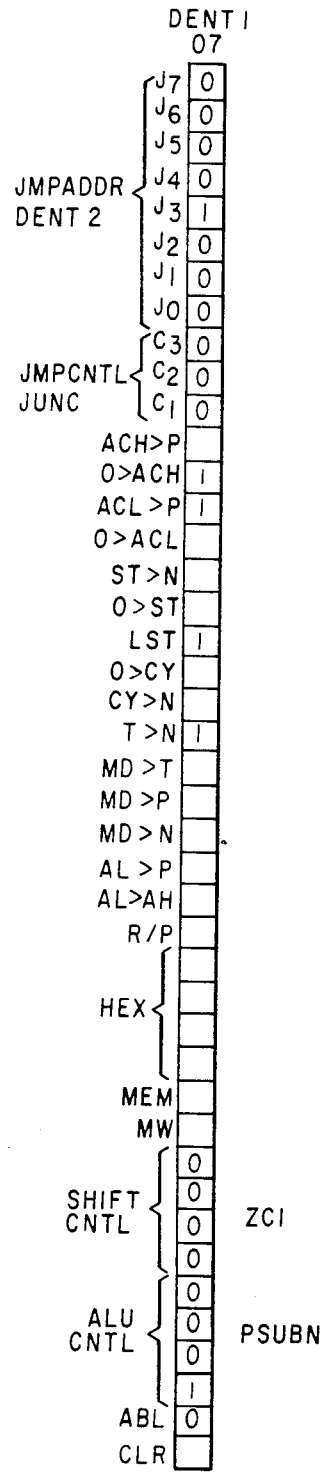

During DENT 1 (FIG. 15), JMPADDR is at 1000, JMPCNTL is at 000, the bits O>ACH, ACL>P, LST and T>N are at 1, SHIFTCNTL is at 0 and ALUCNTL is at PSUBN. Thus, TD (n−1) which constitutes the contents of register T is loaded on bus N, while the value $TD_n$ which was conserved in the register ACL (microcode WAIT) is loaded on bus P. The unit ALU effects PSUBN and the result dT is loaded in the register ACH by the output bus O.

According to the arithmetic result obtained, three cases are possible. These cases are illustrated in the following examples.

First case

The result found is negative.

Suppose that $TD_n = 28$ and $TD_{n-1} = 32$, this latter value resulting from the preceding processing cycle.

During the microcode DENT 1, the executed operation is:

$$28 - (32 + 1) = -5$$

$$dT = -5$$

Figure 16:
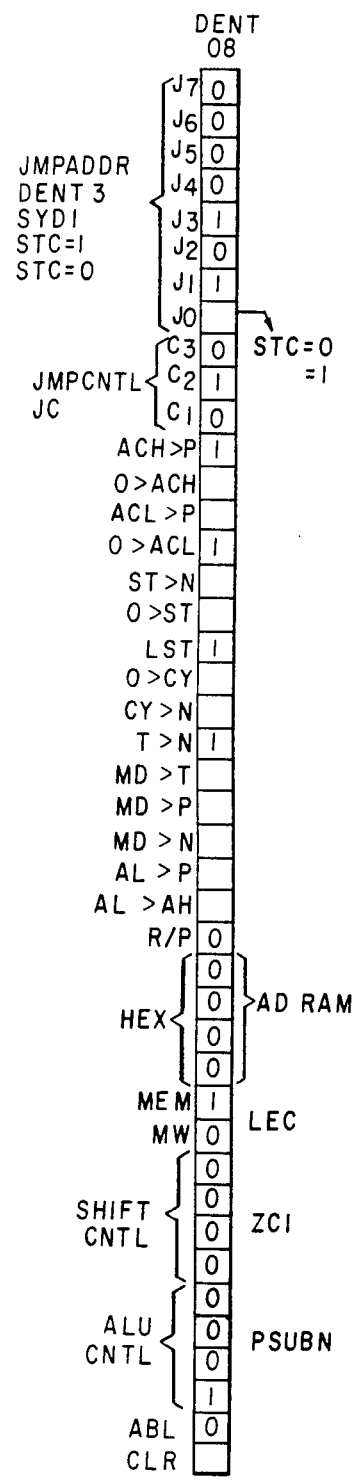

This value implies a carry resulting from the arithmetic calculation. The state register receives, thus, by LST=1, a bit 1 in the binary position STC. (STC=1) which is thus provisionally memorized. The program passes unconditionally to DENT 2, a microcode of which the positions and fields have the values indicated in FIG. 16.

During the microcode DENT 2, the calculation establishes the relation:

$$-5 - (32 + 1) = -38$$

$$dT = -38 \ STC = 1$$

The program then passes in a conditional manner to the following microcode (box 11; FIG. 9) which, as STC was equal to 1 during the course of the execution of the microcode DENT 1, will be the microcode DENT 3, due to the fact that the binary position J0 is set to 1.

The response to the test of case 11 will thus be "yes", and the program jumps to case 12 for incrementing the tooth number and execution of the microcodes DENT 3 to DENT 6. This first case corresponds to a deceleration of the internal combustion motor or a constant speed operation.

If the response of the test of the case 11 is "no", this indicates case 2 or 3.

Second case

Suppose that $TD_n = 38$ and $TD_{n-1} = 32$.

The first calculation during the course of the microcode DENT 1 yields:

$$38 - (32 + 1) = 5$$

$$dD = 5 \ STC = 0$$

During the execution of microcode DENT 2, by unconditional passage from DENT 1 to DENT 2, one has:

$$5 - (32 + 1) = -28$$

$$dT = -28 \ STC = 1$$

The program then effects a jump to box 13 which represents the first microcode SYD 1 (OB) of subprogram SYD, which prepares the calculation per se of the ignition advance. However, since, in the sample of the second case, the value STC=1 during the course of execution of DENT 2, the program does not enter into loop SYD, but effects a jump to the microcode DENT 3, after having passed via microcode SYD 1B (OD) of box 14, which is adapted to address the emplacement of address 0 in RAM 3 for placing the value RD on bus MD. It is to be noted that the second case corresponds to an acceleration.

Third case (response to the test of box 15 is "no")

Suppose that $TD_n = 96$ and $TD_{n-1} = 32$.
The microcode DENT 1 establishes:

$$96 - (32 + 1) = 63$$

$$dT = 63 \ STC = 0$$

The microcode DENT 2 calculates:

$$63 - (32 + 1) = 30$$

$$dT = 30 \ STC = 0$$

The fact that STC=0, after execution of microcode DENT 1, causes the program to jump to the loop SYD of the sub-routine and to remain there, as the value of STC found during the course of execution of the microcode DENT 2 is also equal to 0.

The second microcode of the sub-routine SYD 2 (OC) permits the tooth number to be reset to 0. Thus, RD=0 and CY=0 at box 16 of the flow chart.

Then, the continuation of the loop SYD is carried out which determines the calculation of the ignition advance as a function of the calculated parameters and previous measurements, such as speed, pressure, antiknock, temperature, etc. This calculation is effected from a table which is loaded in the memory ROM 2, the contents of which includes, for each ensemble of parameter values, a certain binary value representing the ignition advance required at his moment. The result of this calculation entails the production of two binary values representing, respectively, the moment of the commencement of ignition RDON and the end of ignition RDOF, as well as two values RFTD and RFTD, this latter value being calculated as a function of the saturation level of the ignition transistor, a level which one reduces to a minimum to conserve energy. The role of these signals and these values will appear subsequently. The values calculated during the execution of this subprogram are memorized in the memories ROM or RAM, according to the case, in order that they might be extracted therefrom at the proper moment during the execution of other microcodes.

It has already been set forth that the table which allows the finding of the ignition instant is memorized in read only memory 2. In the case represented, this memory is integrated on the same semi-conductor chip as the rest of the circuit. However, it is also possible to utilize an independent memory which can be connected to the circuit according to the invention, and possibly exchanged with another read only memory containing a different table with a view to adapt the circuit to other motor operation conditions. In this case, the buses MD and ADDR (FIG. 1) leave the circuit to be connected to this independent read only memory.

Figure 10:
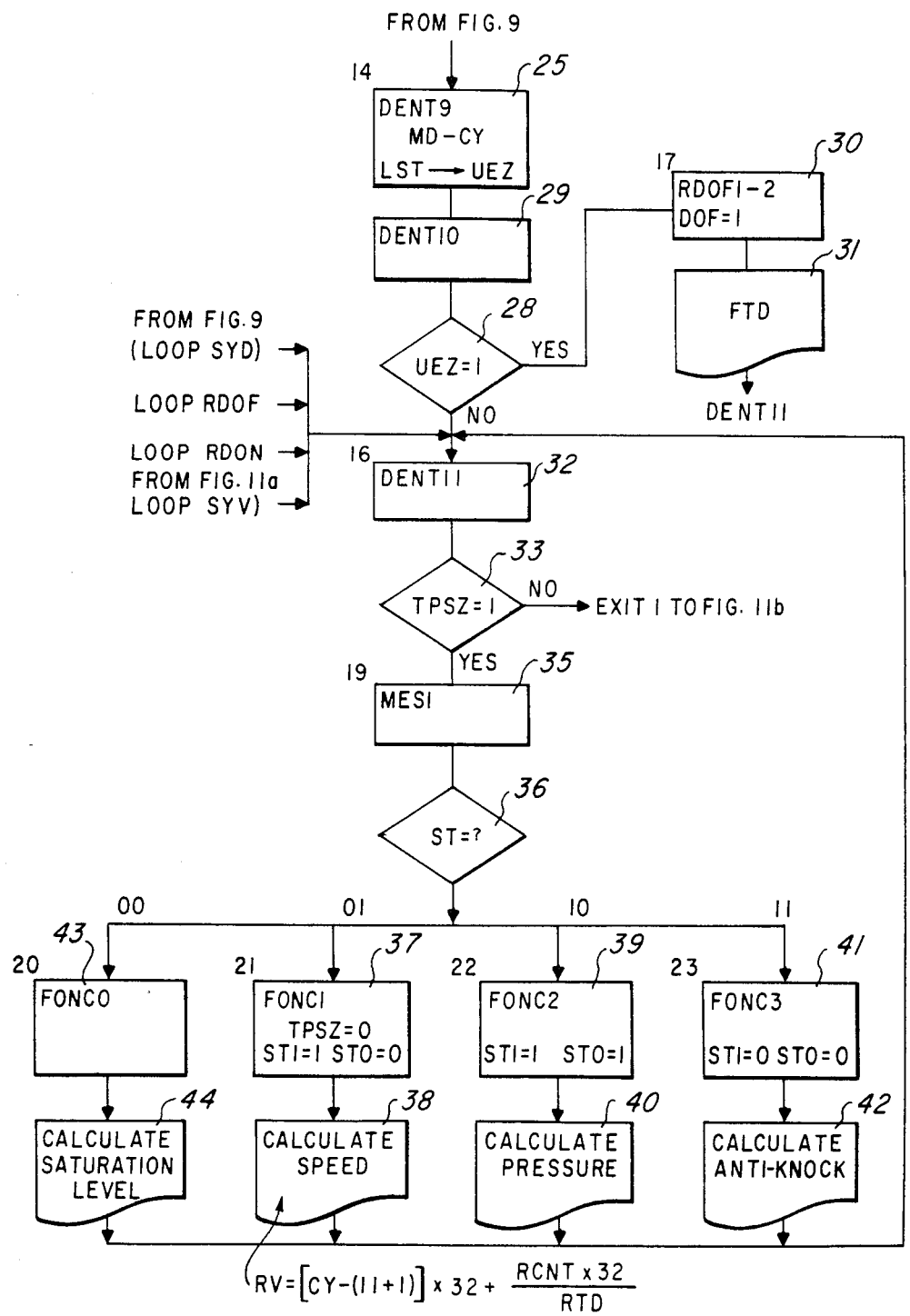

After the calculation of the ignition advance which has just been described, the program effects a jump to microcode DENT 11 (16) represented at box 32 in FIG. 10.

The execution of all of the following microcodes takes place in a manner analogous to that of the microcodes WAIT, TRAN 1, TRAN 2, DENT 1 and DENT 2 and they will not therefore be reconsidered in detail in the remainder of the description. The operations effected during the execution of each microcode are set forth in the listing annexed to the instant description.

If the above first or third cases results in the execution of microcode DENT 3, the program follows with microcodes DENT 4 to DENT 6 until test SYV, which is adapted to determine if the program must pass to the microcode DENT 7 or enter a loop of subprogram SYV, (boxes 13 to 16 of the flow chart, FIG. 9).

As indicated above, if the program effects a jump to microcode DENT 3, (OA), there is produced an incrementation of the tooth number from the value which, during the microcode DENT 2 or SYD1B, was extracted from memory RAM (RD>MD), the operation effected being $MD=MD_{n-1}+1$. This new value is loaded in the RAM and also in the counter CY (FIG. 3).

The microcode DENT 4 (09) causes the transfer of the value TD previously measured during the course of the cycle to the address HEX 1 of the memory RAM 3 (value RTD).

The microcode DENT 5 causes a search for the tooth on the disc periphery 5a which located to correspond to the high still point of the motor cylinder (production of signal SYV or PMH). Suppose that this tooth is the eleventh after the triple tooth constituting the reference. The number of this eleventh tooth should not be confused with the microcode DENT 11. By appropriately constructing the device, one can have the high still point being located at a different angular position with respect to the triple tooth. However, in the example, the microcode effects the subtraction of 11 from the contents of counter CY, the result of which being placed in the field HEX of this microcode. This field is transferred by bus AL to the bus P, while the number of teeth is transferred from counter CY to the bus N. The result of the subtraction effected in the unit ALU is examined and stored in the bit UEZ of state register ST (FIG. 3).

In box 15, which represents the execution of microcode DENT 6 (OF), the value RDON is placed on the bus MD, this value being stored at the address HEX 4 of RAM 3, the value previously having been calculated in the loop SYV.

Then, depending on the result of the operation effected in box 14 (UEZ=0 or UEZ=1), that is, depending on the test of box 16, the program jumps to microcode DENT 7 (10) of box 17, or to the microcode SYV 1 (11) of box 18 (FIG. 11a) for entering into loop SYV which assures the preparation of a plurality of parameters to be used in subsequent calculation and also in the calculation of the scale factor. It is to be noted that the fact that UEZ is equal to 0 signifies that, during the current program execution cycle, the eleventh tooth is not yet positioned before detector 5d, and there is to be effected one or several other cycles before this eleventh tooth is to be found.

The first microcode of loop SYV of box 18 consists of introducing, into register T, the numerical value 8 with the aid of field HEX of this microcode. To do this, one effects an addition operation in the unit ALU which is an inherent condition of the system, (contents of HEX on bus P).

The microcode SYV 2 (address 1b) of box 19, loads the value 255 in the register ACH. This value is needed for subsequently calculating the speed of rotation of the motor and it is related to a predetermined measurement time and also a fixed period of the clock H. The value 255 is of course easy to generate in an eight bit system and results from the addition of the contents of buses, P and N and N with Z>T and Z>N.

In the example, the measurement time of the speed is selected to be 1.70 ms, that is, passage of eight successive teeth before detector 5d when the speed of rotation of the motor is 6,400 T/MN. With a period of the base clock of 6.6 microseconds, one would have therefore a relation of 257.5 for expressing the total necessary duration of the speed measurement. However, in order to take into account the execution times of the preceding microcodes, it suffices to count only 255 clock periods in order to determine this duration and to count down the corresponding value in a register. Consequently, during microcode SYV 2, the value 255 is loaded in register ACH as described above, while subsequently, by microcode SYD 3, the contents of register ACH is transferred to register TPS by bus MD, the field HEX being at 0110.

The microcode following SYV 4 to the address ID of CROM serves to start the countdown counter (box 21 of the flow chart). In order that the circuit can effect the speed measurement, the bits ST0 and ST1 must therefore take respectively the values 1 and 0. This is obtained by effecting an operation OU on the contents of the bus N and P after having loaded bus P with the value 1 (HEX to 1). The result of the logical operation OU is placed in register ST (least significant bits).

The loop SYV is then terminated with a calculation sub-routine which effects the algorithm:

$$RF=(RTD \times RF_{n-1})/32$$

in order to determine the new scale factor as a function of the new value (if there is one) of TD. This new scale factor is memorized at address 7 of memory RAM after which the program jumps to the microcode DENT 11 (case 22).

If the result of the test of box 16 is negative, the program continues with microcode DENT 7 to address 10 (box 17). This microcode permits testing, in its turn, whether the tooth number corresponds to the value RDON which was previously loaded on bus MD from the RAM during the execution of microcode DENT 6. This value is placed on bus P and is compared with the contents of register CY which is loaded on the bus N. If the operation effected gives rise to a carry, UEZ will be equal to 1 and the program jumps to loop RDON (FIG. 9) after execution of microcode DENT 8 corresponding to address 12 (box 23) during which RDOF is extracted from the memory RAM in order to be placed on bus MD.

If the test UEZ=1 (box 24) results in a negative response, the program continues with the execution of microcode DENT 9 corresponding to address 14 (box 25).

The loop RDON is adapted to set the bit DON of register I/OST to 1. At this is the third bit of this register, the microcode RDON 1 (box 26) consists of effecting PADDN on the field HEX equal to 4 with the bus N at 0.

The value RDON calculated during the execution of the subprogram loop SYD was assigned a value RFTD, which represents a fraction of a tooth expressed in 1/32nd's of a tooth. During the other microcodes of the loop RDON, this value RFTD is to be brought up to date as a function of the modification of the value TD which was able to take place after the execution of loop SYD. This is why the last microcodes of the loop RDON effect a calculation according to the algorithm:

$$FTD_{RDON} = \frac{RTD \times RFTD}{32}$$

in order to relate this fraction of a tooth to the value of the last measured TD.

After execution of the loop RDON, the program jumps to microcode DENT 11 (box 32).

If the test UEZ=1 (box 24) proves negative, the program continues with the microcode DENT 9 (box 25), which is adapted to compare the value RDOF extracted from memory RAM and calculated during the course of execution of the loop SYV, with the contents of register CY, which represents the current tooth number so that a new test UEZ=1 can be effected (box 28). The microcode DENT 10 (box 29) is adapted to reset the state register ST to 0.

If the response to the test of the box 28 is "yes", the program enters into the loop RDOF for the execution of the microcodes RDOF 1 and RDOF 2 (box 30) and the calculation (box 31) of the value FTD updated in an manner analagous to that described in regard to the loop RDON. The bit DON of the register I/OST is set to 1.

Figure 11A:
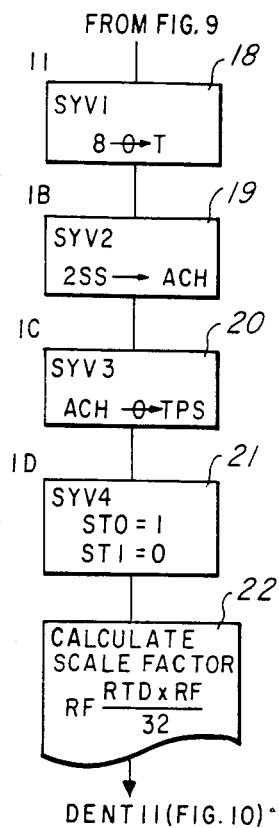
Figure 11B:
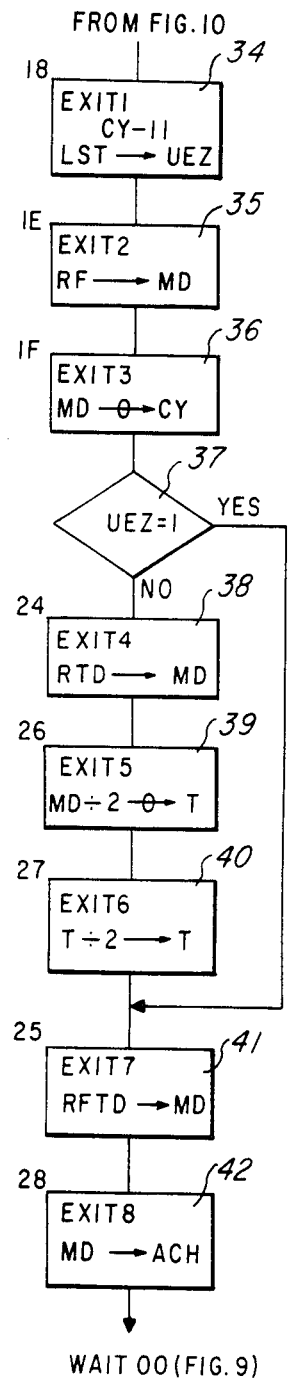

If, on the other hand, the response to the test of box 28 is "no", the program passes to microcode 11 (box 32) which permits the execution of a test for determining whether the measurement time, the value of which being memorized in register TPS has passed (box 33). If the response to the test is "no", the program passes to loop EXIT commencing with the microcode EXIT 1 to address 18 (box 34; FIG. 11b). However, if the response is "yes" (TPSC=1) the program passes to microcode MES 1 corresponding to address 19 (box 35), which prepares to execute one of the four calculation loops of the parameters speed, pressure, anti-knock, and saturation level.

During the course of execution of the loop SYV, and, more precisely, due to microcode SYV 4, the register TPS commences to count down the time of speed measurement which is 1.7 msec, as previously described. For the same microcode, the bits ST1 and ST0 of the state register ST have been set, respectively, to 0 and 1.

Consequently, when, after the test of box 33, the program passes to the calculation loops during a first pass, the bits of state register ST are prepositioned at these values in such a way that, at the time of the test ST=? (box 36), the program passes directly to the speed calculation loop commencing with the execution of the microcode FONC 1 (box 37). Meanwhile, during the execution of the microcode MES1, the bit TPSZ has newly been set to 0 by an operation IPANDN on the value HEX=3, and the third bit TPSC of the state register ST, which are respectively placed on the buses P and N. Then, there takes place a calculation sub-routine (box 38) from which results in the speed value according to the algorithm:

$$RV=[CY-(11+1)]\times 32+[(RCNT\times 32)/RTD]$$

the value RV representing, thus, the speed expressed in 1/32nd's of tooth.

At the end of this sub-routine loop of box 38, the register TPS is loaded with the value corresponding to the time necessary for effecting the measurement and the calculation of the pressure and this register is triggered to count down to 0 by the base clock H. The program passes to the microcode DENT 11 and the test TPSC=1 is again effected.

Meanwhile, during the execution of the microcode FONC 1, the bits ST1 and ST0 of the state register ST have been set respectively at 1 and 0 by the operation PXORN with the field HEX=3 (bus P) and the values 0 and 1 of the bits ST1 and ST0. Consequently, when, during one of the next cycles of the program, the test TPSC=1? again results in a positive response, the program passes to the pressure calculation loop, the bit TPS being again returned to 0 during MES 1 and the bits ST1 and ST0 being set to 1 and 1, respectively, during the microcode FONC 2 (box 39).

Thereafter, a subprogram loop effects the calculation of pressure (box 40). At the end of this loop, the register TPS is again loaded with a value corresponding to a time interval, which, this time, is necessary only for the test TPSZ=1?, since, strictly speaking, the measurement of neither the anti-knock nor the saturation level necessitates a fixed interval of time. Consequently, when a next cycle arrives at microcode DENT 11, the program enters into the sub-routine loop for the calculation of the anti-knock (box 42), the bit TPSZ being preliminarily set to 1 and again reset to 0 by microcode MES 1. During the execution of FONC 3 (box 41), the bits ST1 and ST0 are both set to 0 by an operation IPANDN when the field HEX is equal to 3 and the bits ST1 and ST0 are set to 1. If the bit TPSZ is again set to 1 by the loading of the register TPS, and then to 0 during the execution of microcode MES 1, the program can pass to the sub-routine loop for the calculation of the saturation level (box 44) after execution of the microcode FONC 0 (box 43) corresponding to the address 20, which effects the reset to 0 of the bits ST1 and ST0 of the state register ST by HEX 3 by means of the operation IPANDN.

During one of the following cycles, when the program enters into the loop SYV, the register TPS can again be loaded with a value corresponding to an interval of 1.7 msec. and the bits ST1 and ST0 set to 0 and 1 respectively.

If the result of the test TPSZ=1 corresponding to box 33 (FIG. 10) is negative, the program passes to an EXIT loop. This loop has as its object the preparation of the calculation unit of FIG. 3 for a new program cycle (see boxes 34 to 42).

Initially, in EXIT 1 to address 18, the tooth number is compared with the contents of counter CY and the state register ST is loaded with the result of the comparison which is set at the bit UEZ.

In EXIT 2 (address 1E), the value RF of the scale factor is extracted from the RAM 3 and placed on bus MD and on EXIT 3 (address 1F), the contents of the bus MD is placed in counter CY.

If the bit UEZ loaded in state register ST is 1, the program passes to microcode EXIT 7 (25) so that in this microcode and the following, the value RFTD loaded in the RAM can be placed in the register ACH of the calculation unit. If the bit UEZ is equal to 0, the program executes the microcodes EXIT 4, EXIT 5, and EXIT 6 for loading the value RTD/4 in the register T. This value is necessary for allowing tests and adjustments to be made on the entire apparatus and will not therefore be reconsidered in this description.

GENERATION OF THE IGNITION SIGNAL

In FIG. 8, it was seen that, during each turn of the disc periphery 5a, the circuit twice generates a signal DM representing a triple tooth and twice generates a signal PMH twice representing a high still point in one of the motor cylinders (it is to be noted that in the example, this is a four cylinder, four stroke, motor, but that this is not to be considered limiting).

It has been seen that the measurement and calculation of the speed (1.7 ms) of the pressure (160 microseconds), and of the anti-knock (this measurement following the end of the pressure measurement and the beginning of the following signal DM), and of the saturation level (between the signals DM and PMH), are effected in asynchronism with regard to the execution of a microcode program and that these measurements are not effected except in response to the test TPSZ=1? utilized in box 33 of FIG. 10. On the other hand, at each program cycle, one loads into counter TD the number of pulses HTD occurring between the passages of two consecutive teeth before detector 5d. This value loaded into register TD is a function of the speed of the motor and can therefore be variable from one tooth to another according to whether the motor is accelerated, slowed down, or functions at a constant speed. At each program cycle, all of the calculated values are expressed in constant fractions of teeth and it has been seen that, for convenience, all of these values are recalculated into 1/32nd's of teeth.

In addition, during each program cycle, a plurality of tests are effected in order to detect if a triple tooth passes before a detector or whether the ignition transistor is to be placed into conduction or be cut off, this latter test leading to the determination of the exact instant of ignition.

Figure 17:
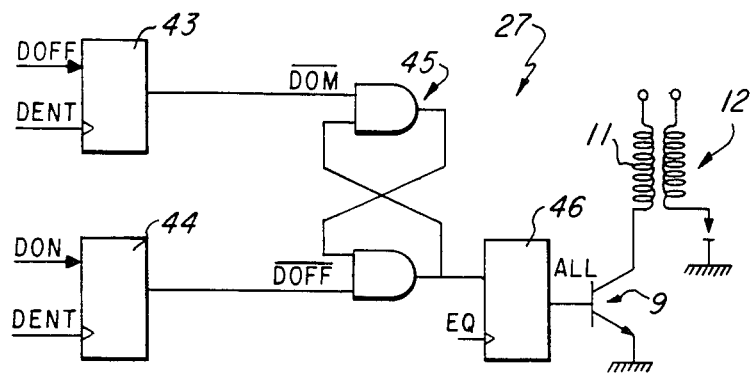
FIG. 17 is a schematic of a circuit generating the ignition signal.
Figure 18:
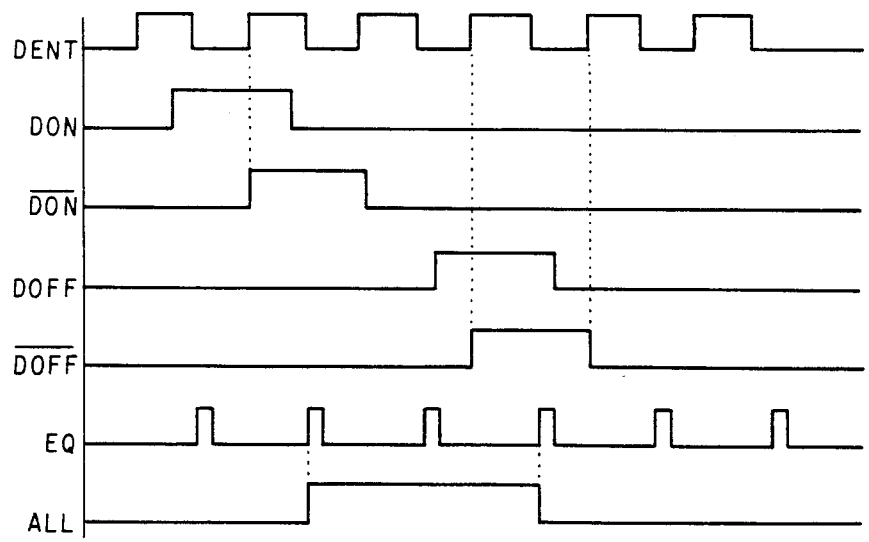
FIG. 18 is a time diagram utilized in the circuit of FIG. 17.

FIGS. 17 and 18 represent respectively a schematic and a time diagram illustrating one of the ways of generating the ignition signal.

The signal is produced in the logic circuit 27 (FIG. 4) which includes two inputs ET 43 and 44 to which are applied respectively the signals DON, DOF and DENT, the two first signals emanating from state register I/OST of which the corresponding bits are set to level 1, if appropriate, during the respective loops RDON and RDOF of the program.

The output of the gate 43 thus produces a transition (signal DON) upon the coincidence of these signals DON and DENT, while the output of the gate 43 generates a signal DOF upon the coincidence of the signals DOF and DENT.

The two inverse signals are applied to a flip-flop 45 and selectively applied (according to their appearance during the execution of the distinct program cycles) to a flip-flop 46 to which is also applied a signal EQ emanating from comparator COMP (FIG. 4) which produces a signal when the contents of register TD and register FTD are equal. It is to be recalled that the register TD is incremented by one unit at each appearance of the signal HTD during each period of the signal DENT, and that equality is therefore obtained each time that the contents of register TD becomes equal to those of register FTD. The signal EQ is thus generated at each period of the signal DENT but it is not useful except when the signal DON and DOF are high.

The output of the flip-flop ET 46 orders directly, or by the intermediary of an appropriate amplifier, the ignition transistor 9, the ignition being effectively obtained at the trailing edge of the signal ALL, when the signal EQ appears upon the coincidence of the signals DOF and DENT.

The appearance of the signal DON is conditioned by the calculation of the saturation level, the result of this calculation is compared with a set value expressed in periods of the base clock. The program tends to approach, as closely as possible, this set value during the different execution cycles in such a manner that the ignition transistor is not ignited each time at the last possible moment, that is, just before the instant when ignition must take place. This method permits the reduction of the energy dissipated in the transistor and thus increases the duration of useful life. In effect, especially at low speeds, in the absence of optimum calculation of the saturation level, the transistor can remain conductive a relatively long time in awaiting the ignition instruction. This drawback is thus entirely avoided in the circuit according to the invention.

The determination of the moment at which the signal EQ is to be generated is governed by the number of 1/32nd's of teeth which is composed of a number of teeth N counted from the reference triple tooth multiplied by the value TD, to which is added the value FTD. Consequently, the value calculated during the loop SYD is of the form:

$$\text{Ignition instant} = ND \times 32 + \frac{FTD \times 32}{TD}$$

The same formula can apply to the signals DOF and DON so that, according to the case, the value FTD calculated during a cycle of the program can be applied either to the signal EQ or to the signal DON, or also to the signal DOF.

SPEED CALCULATION

Figure 19:
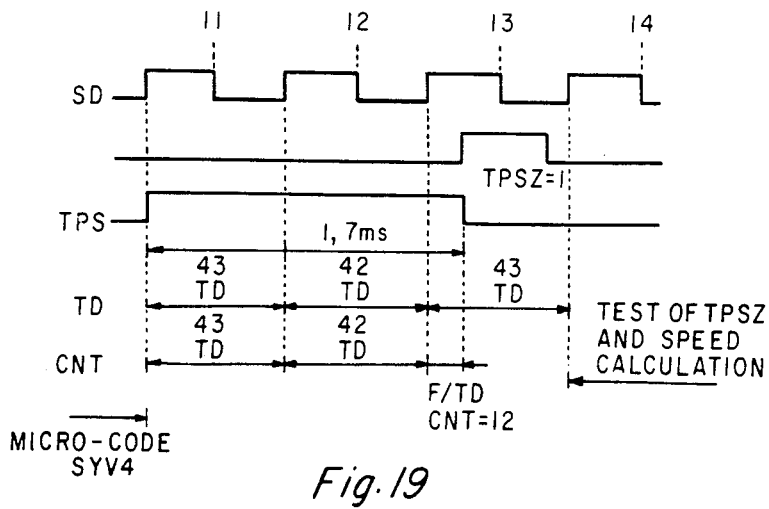
FIG. 19 is a time diagram illustrating the obtainment of the speed value of the internal combustion motor.

FIG. 19 is a diagram illustrating how the speed calculation is effected. It is recalled that this calculation is carried out in regard to a period of 1.7 ms triggered by the microcode SYV 4 which triggers the counter TPS when the search test of the tooth number 11 is positive. Suppose that, at this instant, the value TD is 43 and that this value evolves from the 11th to the 12th tooth from 43 to 42. The counter CNT which counts the pulses HCNT registers the same value TD as it is not stopped, neither during the passage of the 11th tooth nor during that of the 12th. On the other hand, in the given example, this counter is stopped during the passage of the 13th tooth as, taking account of the speed of rotation of the motor at this moment, it is supposed that the period of 1.7 ms terminates during the cycle of the 13th tooth. On the other hand, the register TD again registers a value 43, but as the signal TPS goes to a low level, the counter CNT can (in this example) count only to 12, which represents the value FTD. This is to say that the speed is composed of the sum of the clock pulses appearing during two teeth and the twelve pulses appearing during the course of the passage of the 13th tooth, all of which must be converted in order to be expressed in 1/32nd's of a tooth.

It results that, in the example of FIG. 19, $$V = CY \times 32 + [(CNT \times 32)/TD]$$

or $V = 2 \times 32 + (12 \times 32)/43 = 72$.

This value is loaded in the RAM in eight bits, of which the three most significant bits contain the number N and the five others, the contents of counter CNT at the moment when the signal TPS passes to a low level.

The result of the calculation of the speed is subsequently utilized during the loop SYD for the calculation of the ignition advance, which calculation entails a consultation of a table in the memory ROM and a searching of the advance corresponding to the calculated speed and other calculated parameters. This determination procedure of the ignition advance is known and will not be described in detail here.

The control circuits according to the invention allows the quasi-instantaneous updating of the ignition instants of an internal combustion motor as a function of all important parameters which could influence its behavior. The rapidity of execution of the measurements and calculations is obtained due to the utilization of a microcode program of which the execution is based on continuous calculation and is renewed for each period of the signal DENT of a value TD representing the duration of each tooth and also on the fact that all of the calculated values are then related to a certain number of fractions of a tooth which is constant regardless of the speed of the motor, and selected as a function of the technology employed (in eight bits in the example set forth).

One also notes that all of the values calculated prior to a given period of the signal DENT are available in the various registers of the circuit almost immediately after the transition to a high level of each signal DENT because of the fact that the transfer of these values from the RAM is executed by the microcode program itself and not by an addressing method usually used in this technology. This transfer is effected at the beginning and at the end of the cycle by the microcodes TRAN and EXIT respectively.

APPENDIX
MICRO-CODE LISTING

| | | |
|---|---|---|
| 00 | WAIT | TD>MD |
| | | Z>N,MD>P |
| | | PADDN,ZCI,LST |
| | | O>ACL |
| | | JD(TRAN1,WAIT) |
| 01 | TRAN1 | ACH>P,Z>N |
| | | PADDN,ZCI |
| | | MD>FTD |
| | | MW |
| | | JUNC(TRAN2) |
| 02 | TRAN2 | CY>N,Z>P |
| | | PADDN,ZCI |
| | | MD>F |
| | | MW |
| | | JUNC(TRAN3) |
| 03 | TRAN3 | MD>TD4 |
| | | T>N, Z>P |
| | | PADDN,ZCI |
| | | MW |
| | | JUNC(TRAN4) |
| 04 | TRAN4 | CNT>MD |
| | | JUNC(TRAN5) |
| 05 | TRAN5 | HEX2>AL |
| | | MD>N, Z>P |
| | | PADDN,ZCI |
| | | MW |
| | | JUNC(TRAN6) |
| 06 | TRAN6 | HEX1>AL |
| | | MR |
| | | MD>T |
| | | JUNC(DENT1) |
| 07 | DENT1 | T>N,ACL>P |
| | | PSUBN,ZCI |
| | | O>ACH,LST |
| | | JUNC(DENT2) |
| 08 | DENT2 | HEX0>AL |
| | | MR |
| | | T>N,ACH>P |
| | | PSUBN,ZCI,LST |
| | | JC(DENT3,SYD1) |
| 0A | DENT3 | MD>N,Z>P |
| | | PADDN,ONECI |
| | | HEX0>AL |
| | | MW |
| | | O>CY |
| | | JUNC(DENT4) |
| 09 | DENT4 | HEX1>AL |
| | | Z>N,ACL>P |
| | | PADDN,ZCI |
| | | MW |
| | | JUNC(DENT5) |
| 0E | DENT5 | HEXB>AL,AL>P |
| | | CY>N |
| | | PSUBN,ONECI,LST |
| | | JUNC(DENT6) |
| 0F | DENT6 | HEX4>AL |
| | | MR |
| | | JUZ(SYV1,DENT7) |
| 10 | DENT7 | MD>P,CY>N |
| | | PSUBN,ONECI,LST |
| | | JUNC(DENT8) |
| 12 | DENT8 | HEX6>AL |
| | | MR |
| | | JUZ(RDOF1.DENT9) |
| 14 | DENT9 | MD>P,CY>N |
| | | PSUBN,ONECI,LST |
| | | JUNC(DENT10) |
| 1A | DENT10 | Z>N,Z>P |
| | | PADDN,ZCI,LST |
| | | JUZ(RDOF1,DENT11) |
| 16 | DENT11 | JT(MES1,EXIT1) |
| 19 | MES1 | HEX4>AL,AL>P |
| | | ST>N |
| | | IPANDN |
| | | O>ST |
| | | JST (FONC0) |
| 20 | FONC0 | HEX3>AL,AL>P |

APPENDIX
MICRO-CODE LISTING

|    |       |                               |
|----|-------|-------------------------------|
|    |       | ST>N                          |
|    |       | IPANDN                        |
|    |       | O>ST                          |
|    |       | JSUB (Calculate threshold)    |
| 21 | FONC1 | HEX3>AL,AL>P                  |
|    |       | ST>N                          |
|    |       | PXORN                         |
|    |       | O>ST                          |
|    |       | JSUB (calculate speed)        |
| 22 | FONC2 | HEX1>AL,AL>P                  |
|    |       | ST>N                          |
|    |       | OR, O>ST                      |
|    |       | JSUB (calculate pressure)     |
| 23 | FONC3 | HEX3>AL,AL>P                  |
|    |       | ST>N                          |
|    |       | IPANDN, O>ST                  |
|    |       | JSUB (calculate anti knock)   |
|    |       | After calculation JRT (DENT 11) |
| 11 | SYV1  | HEX8>AL, AL>P                 |
|    |       | PADDN,ZCI                     |
|    |       | MD>T                          |
|    |       | JUNC(SYV2)                    |
| 1B | SYV2  | ZP,Z>N                        |
|    |       | INVP,O>ACH                    |
|    |       | JUNC(SYV3)                    |
| 1C | SYV3  | ACH>P, Z>N                    |
|    |       | PADDN,ZCI                     |
|    |       | MD>TPS                        |
|    |       | MW                            |
|    |       | JUNC(SYV4)                    |
| 1D | SYV4  | HEX1>AL, AL>P                 |
|    |       | ST>N, Z>P                     |
|    |       | OR, O>ST                      |
|    |       | JSUB(calculate scale factor)  |
|    |       | After calculation JRT (DENT 11) |
| 15 | RDON1 | HEX4>AL, AL>P                 |
|    |       | Z>N                           |
|    |       | PADDN,ZCI                     |
|    |       | JUNC(RDON2)                   |
|    | RDON2 | MD>I/OST                      |
|    |       | MW                            |
|    |       | JSUB(calculate FTD)           |
| 17 | RDOF1 | HEX8>AL, AL>P                 |
|    |       | Z>N                           |
|    |       | PADDN,ZCI                     |
|    |       | JUNC (RDOF2)                  |
|    | RDOF2 | MD>I/OST                      |
|    |       | MW                            |
|    |       | JSUB(calculate FTD)           |
| 18 | EXIT1 | HEXB>AL, AL>P                 |
|    |       | CY>N                          |
|    |       | PSUBN, ONECI, LST             |
|    |       | JUNC(EXIT2)                   |
| 1E | EXIT2 | HEX7>AL                       |
|    |       | MR                            |
|    |       | JUNC(EXIT3)                   |
| 1F | EXIT3 | MD>N, Z>P                     |
|    |       | PADDN,ZCI,                    |
|    |       | O>CY                          |
|    |       | JUZ (EXIT8, EXIT4)            |
| 24 | EXIT4 | HEX1>AL                       |
|    |       | MR                            |
|    |       | JUNC(EXIT5)                   |
| 26 | EXIT5 | MD>N, Z>P                     |
|    |       | PADDN,RRCZ                    |
|    |       | MD>T                          |
|    |       | JUNC(EXIT6)                   |
| 27 | EXIT6 | MD>T, Z>P                     |
|    |       | PADDN,RRCZ                    |
|    |       | MD>1                          |
|    |       | JUNC(EXIT7)                   |
| 25 | EXIT7 | HEX5>AL                       |
|    |       | MR                            |
|    |       | JUNC(EXIT9)                   |
| 28 | EXIT8 | MD>N, Z>P                     |
|    |       | PADDN, ZCI                    |
|    |       | O>ACH                         |
|    |       | JNNC(WAIT)                    |
| 0B | SYD1  | JC(SYD1B,SYD2)                |
| 0D | SYD1B | HEX1>AL                       |
|    |       | MR                            |
|    |       | JUNC(DENT3)                   |
| 0C | SYD2  | HEX1>AL                       |
|    |       | Z>N, Z>P                      |
|    |       | PADDN,ZCI                     |
|    |       | O>CY, MW                      |
|    |       | JSUB(calculate advance)       |
|    |       | After calculate JRT (DENT 11) |

What is claimed is:

1. A control system for controlling the ignition of an internal combustion motor comprising:
    means for generating a pulse signal having a frequency proportional to the speed of rotation of the motor;
    a plurality of sensing means for detecting time varying operating parameters of the motor;
    a peripheral unit coupled to said pulse signal generating means and to said sensor means;
    ignition means coupled to said peripheral unit for causing ignition of a cylinder upon receipt of a signal from said peripheral unit;
    a calculating unit coupled to said peripheral unit by an address buss and a data buss; and
    a micro-code memory coupled to said calculating unit and to said peripheral unit for producing a cylinder ignition signal from said peripheral unit upon a new calculation generated by said calculating unit at least as fast as each half motor revolution.

2. The control system of claim 1 wherein said peripheral unit comprises:
    a random access memory for temporary storage;
    a look-up memory containing data relating to the instant of ignition as a function of one or more of the operating parameters; and
    interface means for detecting input signals and producing output signals.

3. The circuit of claim 2, wherein said look-up memory is contained on an integrated circuit chip which contains the calculating unit, the peripheral unit, and the micro-code memory.

4. The control system of claim 2, wherein said look-up table memory is an independent read-only memory which can be removed from the remainder of the control circuit for a possible replacement and adaptation to different operating conditions of the engine.

5. The system of claim 2, wherein said peripheral unit further comprises:
    a first register suitable for holding a value proportional to the instantaneous speed of the motor;
    a second register suitable for holding a value representing an instant of ignition of a current ignition cycle;
    a base timer;
    a third register suitable for use as a down counter, wherein said third register decrements as a function of pulses output from said base timer, and further wherein said register is loaded with the value contained in said second register after a complete decrementing;
    wherein said first register is coupled to the output of said third register for counting the number of times that said third register decrements to zero, and further wherein said first and third registers are reset to zero when a pulse signal is generated by said pulse signal generating means.

6. The system of claim 5, wherein said peripheral unit further comprises a fourth register which is suitable for containing a value representing a predetermined measurement used in the calculation of motor speed.

7. The system of claim 1, wherein said calculating unit comprises a plurality of working registers suitable for temporarily holding data to be submitted to calculations and data resulting from calculations, wherein each of said plurality of registers is selectively activated by a field of micro-codes during the execution of these series of codes memorized in said micro-code memory.

8. The system of claim 1, wherein said ignition means comprises a semiconductor component capable of being switched off, wherein the moment of ignition is defined as switching said semiconductor component off.

9. A process for control of an internal combustion motor comprising the steps of:
   generating a pulse signal having a frequency proportional to rotational speed of the motor;
   providing a micro-code memory programmed to control ignition upon a motor position calculation generated at least as often as each half motor revolution;
   calculating in accordance with the micro-code an instant of ignition of an ignition cycle, wherein the instant of ignition is expressed in terms of the period of the pulse signal;
   counting fractions of pulse signal period from a reference moment indicating the start of the ignition cycle in progress; and
   triggering ignition after a selected number of pulse signal period fractions have been counted.

10. The process of claim 9, wherein said calculation step comprises the steps of:
    determining an operating parameter of the motor during an ignition cycle;
    cross-referencing a look-up memory containing values, representing the appropriate ignition moment for the next ignition cycle, with the determined motor operating parameter.

11. The process of claim 10 wherein the motor operating parameter comprises the speed of the motor.

12. The process of claim 10, wherein the motor operating parameter comprises the pressure of the combustable mixture input to the motor.

* * * * *